United States Patent
Ahmad

(10) Patent No.: US 12,080,116 B2
(45) Date of Patent: Sep. 3, 2024

(54) MUTABLE, CONFIGURABLE DEVICE

(71) Applicant: Cuemill Corporation, Mississauga (CA)

(72) Inventor: Bilal Ahmad, Ottawa (CA)

(73) Assignee: CUEMILL CORPORATION

( * ) Notice: Subject to any disclaimer, the term of this patent is extended or adjusted under 35 U.S.C. 154(b) by 0 days.

(21) Appl. No.: 18/355,320

(22) Filed: Jul. 19, 2023

(65) Prior Publication Data

US 2024/0096151 A1  Mar. 21, 2024

Related U.S. Application Data

(60) Provisional application No. 63/390,914, filed on Jul. 20, 2022.

(51) Int. Cl.
| | | |
|---|---|---|
| *G07C 9/00* | (2020.01) | |
| *H04W 4/029* | (2018.01) | |
| *H04W 4/12* | (2009.01) | |

(52) U.S. Cl.
CPC ........ *G07C 9/00309* (2013.01); *H04W 4/029* (2018.02); *H04W 4/12* (2013.01)

(58) Field of Classification Search
None
See application file for complete search history.

(56) References Cited

U.S. PATENT DOCUMENTS

| | | | | |
|---|---|---|---|---|
| 10,096,185 B2* | 10/2018 | Plüss | ...................... | H04L 63/166 |
| 10,885,174 B2* | 1/2021 | Robba | ................... | G06F 21/445 |
| 11,405,361 B1* | 8/2022 | Saalfeld | .............. | H04L 63/0272 |

FOREIGN PATENT DOCUMENTS

| | | | |
|---|---|---|---|
| CA | 3022703 A1 | 4/2020 |
| CA | 3023377 A1 | 5/2020 |
| CA | 3023575 A1 | 5/2020 |

OTHER PUBLICATIONS

International Search Report and Written Opinion for International Application No. PCT/IB2023/057413 dated Oct. 12, 2023.

* cited by examiner

*Primary Examiner* — Adolf Dsouza
(74) *Attorney, Agent, or Firm* — Pillsbury Winthrop Shaw Pittman, LLP

(57) ABSTRACT

A process includes receiving a first message that is generated in response to a first client computing device associating with a first activation device. The first message includes a first client computing device identifier associated with a first user of the first client computing device and a first activation device identifier for the first activation device and identifying, based on an association configuration and the first activation device identifier, a first virtual device that is associated with the first activation device. The process may further include identifying, based on the first virtual device and the association configuration, a first application associated with the first virtual device, and running the first application associated with the first virtual device in response to the first message.

20 Claims, 12 Drawing Sheets

900

| | |
|---|---|
| Title | |
| | 77 Elm |

Identity you want to answer as

| | |
|---|---|
| Answer as | Self |

Location & Proximity Verification

| | |
|---|---|
| type | Home |
| location | Ottawa |
| verify proximity | yes |

Who can initiate

| | |
|---|---|
| video call | everyone |
| voice call | my contacts |
| chat | everyone |

Notifications & Alerts

| | |
|---|---|
| select phone | mobile613 |
| notify by sms | no |
| notify by call | no |
| notify by email | no |

InApp Alerts

| | |
|---|---|
| ring | ding dong 6 |
| video call | pink panther |
| voice call | pink panther |
| chat invite | none |

Do Not Disturb

| | |
|---|---|
| from | 09:00 PM |
| to | 7:00 AM |
| time zone | America/Toronto |
| dnd message | Please visit between 6AM & 10PM |

Activation Status

| | |
|---|---|
| deactivate | ☐ |

Associated Doorbells

Rear
Front

FIG. 9

MUTABLE, CONFIGURABLE DEVICE

CROSS-REFERENCE TO RELATED APPLICATIONS

This patent claims the benefit of priority to U.S. Provisional Patent Application 63/390,914, filed 20 Jul. 2022, titled MUTABLE, CONFIGURABLE DEVICE. The entire content of the aforementioned patent filing is hereby incorporated by reference.

BACKGROUND

1. Field

The present disclosure relates generally to Internet of Things (IoT) systems and more particular to creating virtual devices in a client-server paradigm for a client device based on activation points in the IoT system.

2. Description of the Related Art

The Internet of Things (IoT) describes the network of physical objects that are embedded with sensors, software, and other technologies for the purpose of connecting and exchanging data with other devices and systems over a network. These devices allow for a wide range of applications and are ever increasing with billions of interconnected, everyday devices that provide communication between people, processes, and devices.

SUMMARY

The following is a non-exhaustive listing of some aspects of the present techniques. These and other aspects are described in the following disclosure.

Some aspects include a process including: receiving, with a computer system, a first message that is generated in response to a first client computing device associating with a first activation device, wherein the first message includes a first client computing device identifier associated with a first user of the first client computing device and a first activation device identifier for the first activation device; identifying, with the computer system and based on an association configuration and the first activation device identifier, a first virtual device that is associated with the first activation device; identifying, with the computer system and based on the first virtual device and the association configuration, a first application associated with the first virtual device; and running, with the computer system, the first application associated with the first virtual device in response to the first message.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements:

FIG. 9 illustrates a graphical user interface, in accordance with some embodiments of the present disclosure;

Figure 1:
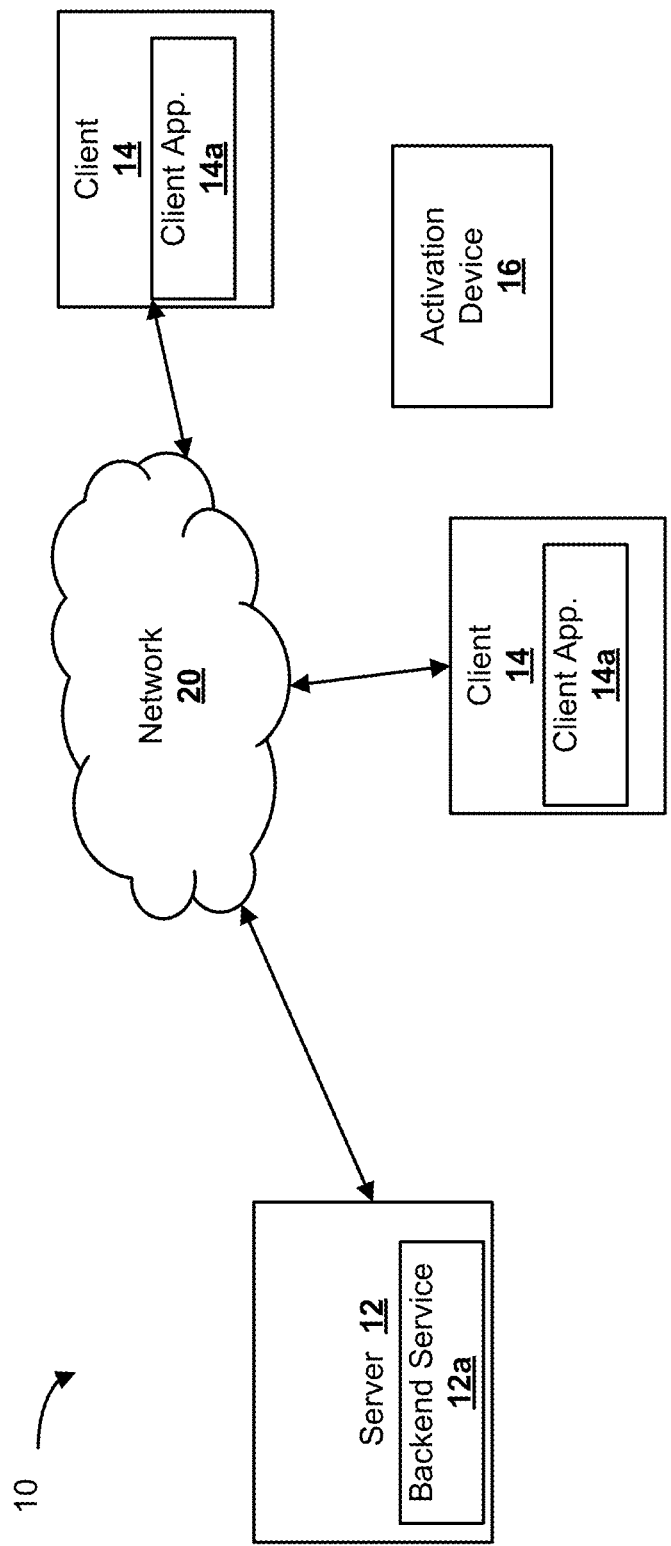
FIG. 1 illustrates a computing environment in which the present techniques may be implemented in some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of proximity devices and the Internet of Things (IoT). Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Various embodiments of the present disclosure provide a framework for creating virtual or logical devices in a client-server paradigm capable of performing specific tasks defined and configured in software, which are activated through points in the physical world, or their equivalent in the digital world, which may be referred to as activation points or activation devices. The activation points, when in the physical world, may include cryptographically secure devices, such as, but not limited to, radio frequency identification (RFID) tags, near field communication (NFC) tags, Bluetooth low energy (BLE) beacons, ultra-wide band (UWB) devices, or other device that may be apparent to one of skill in the art in possession of the present disclosure. The activation points, when virtual in the digital world of embodiments discussed herein, may include an icon in a website with an associated or embedded Java Script object notation (JSON) web token, or a virtual object in an augmented reality or virtual reality space. The design and placement of activation points, as well as the associated messaging, such as through marketing, may communicate the functionality of the associated physical device or virtual device.

In various embodiments of the present disclosure, some classes of systems that may be realized using this paradigm include "receiver" devices, "presenter" devices, and "action" devices. Receiver devices may include portal devices through which others may reach the owner, a service, or other recipient that would be apparent to one of skill in the art in possession of the present disclosure. Presenter devices may include provider devices through which the owner may present proofs, credentials, or other information that would be apparent to one of skill in the art in possession of the present disclosure. Action devices may include some action or task when activated, such as making a connection, generating a memo, subscribing to a group, logging an activity, or any other action that would be apparent to one of skill in the art in possession of the present disclosure. Virtual devices or systems realized in this paradigm may embody functionality that is a combination of features from more than one class. Furthermore, activation devices may be disassociated from one type or class of virtual device and associated with another. This association or disassociation may flexibility afford great value, as elucidated with several use-cases discussed below. As mentioned earlier, the virtual device may be implemented within a client-server paradigm, while certain types of proximity devices (e.g., physical or virtual proximity devices) may serve as activation devices. A client computing device may be a smartphone, a smartwatch, a tablet computer, desktop computer, or any other connected computing device with the ability to interact with the type of proximity device associated with the virtual device. The server(s) may be owned and accessible on the public internet, or they may be provided by a cloud service such as Amazon Web Services (AWS), Google Cloud Platform (GCP), Microsoft Azure, or other cloud service that would be apparent to one of skill in the art in possession of the present disclosure.

When a user activates one of the activation devices, the user may be presented with cryptographically obfuscated data which can only be decrypted by the backend service, and which contains, at the most basic level, a unique identifier for the activation device, and parameters to establish the activation device's authenticity, to rule out counterfeit and tampered with devices and to detect and prevent certain types of misuse. Cryptographic obfuscation may provide security and privacy, and while some of the basic functionality can be realized without cryptographic obfuscation, the practical utility of the virtual device without this security and privacy may be limited. The backend service interprets these data and facilitates interaction with the virtual device as per its function, features, configuration, and owner preferences. While simple in concept, several types of devices with powerful real-world utility may be realized within this framework. Systems and methods of the present disclosure describe several applications implemented in the framework (e.g., the loop and the passport). The loop may belong to the receiver class, while the passport may belong to the presenter and action classes. Additionally, notions of personas, acquaintances, and presumed-friends are introduced in new and specific manners that add value to interactions created around the virtual devices and the platform service.

FIG. 1 illustrates an example of a computing environment 10 in which the present techniques may be implemented. In some embodiments, the computing environment 10 is a distributed computing environment implementing a client/server architecture, though other architectures are contemplated, including monolithic architectures executing on a single computing device. In some embodiments, the computing environment 10 includes a server computing device 12, client computing devices 14, an activation device 16 (e.g., the activation devices discussed above), and a network 20, such as the Internet, by which these components may communicate.

In some embodiments, the client computing devices 14 are desktop computers, laptop computers, in-store kiosks, tablet computers, mobile phones, head-mounted displays, wearable devices, or the like, executing an operating system and client application 14a such as, for example, a web browser or native application in which the described user interfaces are presented. Two client computing devices 14 are shown, but embodiments may support substantially more concurrent sessions, e.g., more than 100, or more than 1,000 geographically distributed sessions around the US or the world.

In some embodiments, the server computing device 12 is a nonblocking web server or application program interface server configured to service multiple concurrent sessions with different client computing devices 14, for instance implementing a model-view-controller architecture or other design. In some embodiments, the server computing device 12, via a backend service 12a, may dynamically generate assets, markup language instructions, and scripting language instructions responsive to requests from client computing devices 14, via the client application 14, to send user interfaces to, or update user interfaces on, those client computing devices 14. The user interface may evolve over time (e.g., in a web application), in some cases, displaying new resources (e.g., images and other data) sent from the server computing device 12 responsive to user inputs to the user interface. A configuration engine and rendering engine included on the server may be used to generate image files and metadata used by the server computing device 12 to generate the user interfaces.

In various embodiments, the activation device 16 may include physical or virtual activation devices. The activation device 16, when in the physical world, may include cryptographically secure devices, such as, but not limited to, RFID tags, NFC tags, BLE beacons, UWB devices, or other device that may be apparent to one of skill in the art in possession of the present disclosure. The activation device 16, when virtual in the digital world of embodiments discussed herein, may include an icon in a website or a virtual object in an augmented reality or virtual reality space with an associated or embedded Java Script object notation (JSON) web token or other cryptographically obfuscated token for securely embedding information in an HTML element or a virtual object. In some embodiments, the activation device 16 may be included in a client computing device 14, and thus, may require power.

In some embodiments, the server computing device 12, the activation device 16, or the client computing device 14 may execute a process, for example, by executing program code stored on a tangible, non-transitory, machine-readable medium. The illustrated operations may be executed in a different order, omitted, replicated, executed concurrently, executed serially, have additional operations inserted, all be automated, involve human intervention, or otherwise be modified relative to the arrangement depicted, which is not to suggest that any other description herein is limiting.

Figure 2:
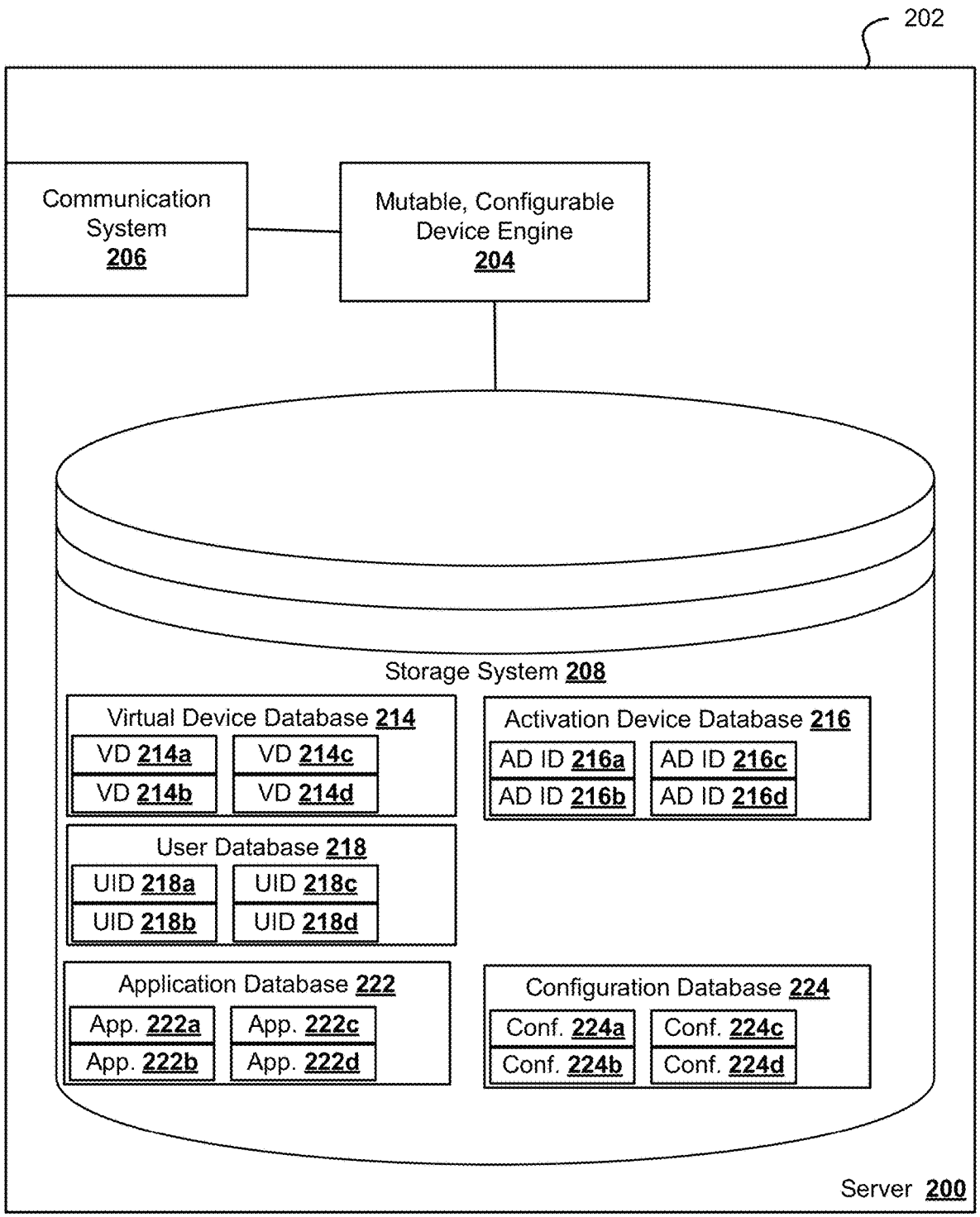
FIG. 2 illustrates a block diagram illustrating an example of a server computing device of the computing environment of FIG. 1, in accordance with some embodiments of the present disclosure.

An embodiment of a server computing device 200 is illustrated in FIG. 2 that may be the server computing device 12 discussed above with reference to FIG. 1. As such, the server computing device 200 may include a server or a plurality of servers or computers that distribute operations across the plurality of servers. In the illustrated embodiment, the server computing device 200 includes a chassis 202 that houses the components of the server computing device 200, only some of which are illustrated in FIG. 2. For example, the chassis 202 may house a processing system (not illustrated) and a non-transitory memory system (not illustrated) that includes instructions that, when executed by the processing system, cause the processing system to provide a mutable, configurable device engine 204 that is configured to perform the functions of the mutable, configurable device engines or servers discussed below. The mutable, configurable device engine 204 may be the backend service 12*a* or provide a portion of the backend service 12*a* with reference to FIG. 1) In the specific example illustrated in FIG. 2, the mutable, configurable device engine 204 may be configured to perform at least a portion of the functionality described herein such that resources on the client computing devices 14 may be freed to perform other functionality.

The chassis 202 may further house a communication system 206 that is coupled to the mutable, configurable device engine 204 (e.g., via a coupling between the communication system 206 and the processing system) and that is configured to provide for communication through the network 20 as detailed below. The communication system 206 may allow the server computing device 200 to send and receive information over the network 104 of FIG. 1.

The chassis 202 may also house a storage device (not illustrated) that provides a storage system 208 that is coupled to the mutable, configurable device engine 204 through the processing system. The storage system 208 may be configured to provide various databases. For example, the storage system 208 may store a virtual device database 214 that may include a plurality of virtual devices 214*a*, 214*b*, 214*c*, or up to 214*d*. The virtual devices 214*a*-214*d* may include the various loop or passport devices discussed herein. The storage system 208 may include an activation device database 216 that includes activation device identifiers 216*a*, 216*b*, 216*c*, or up to 216*d* of the activation devices 16 and any other information associated with the activation devices. The storage system 208 may include an owner database 218 that includes user identifiers 218*a*, 218*b*, 218*c*, or up to 218*d* of users of the mutable, configurable device system and any other information associated with the users. In addition, the storage system 208 may include at least one application in an application database 222 that provides instruction to the mutable, configurable device engine 204 when providing instructions to the client computing devices 14 of FIG. 1 discussed herein. As illustrated, the application database 222 may include applications 222*a*, 222*b*, 222*c*, or up to 222*d*, which may provide separate applications or different configurations of a single application.

In various embodiments, the storage system 208 may include an configurations database 224 that includes configurations 224*a*, 224*b*, 224*c*, or up to 224*d*. The configurations 224*a*-224*d* may provide the mappings between the users 218*a*-218*d*, the virtual devices 214*a*-214*d*, the activation devices 216*a*-216*d*, and the applications 222*a*-222*d*. The configurations 224*a*-224*d* may be edited by the mutable, configurable device engine 204 to change the mappings between the various virtual devices, users, activation devices and applications. The configurations 224*a*-224*d* may also include other instructions or permissions besides the mappings to allow or deny certain features of the applications 222*a*-222*d*. While a specific server computing device 200 has been illustrated, one of skill in the art in possession of the present disclosure will recognize that other server devices (or other devices operating according to the teachings of the present disclosure in a manner similar to that described below for the server computing device 200) may include a variety of components and/or component configurations for providing conventional computing device functionality, as well as the functionality discussed below, while remaining within the scope of the present disclosure as well.

Figure 3:
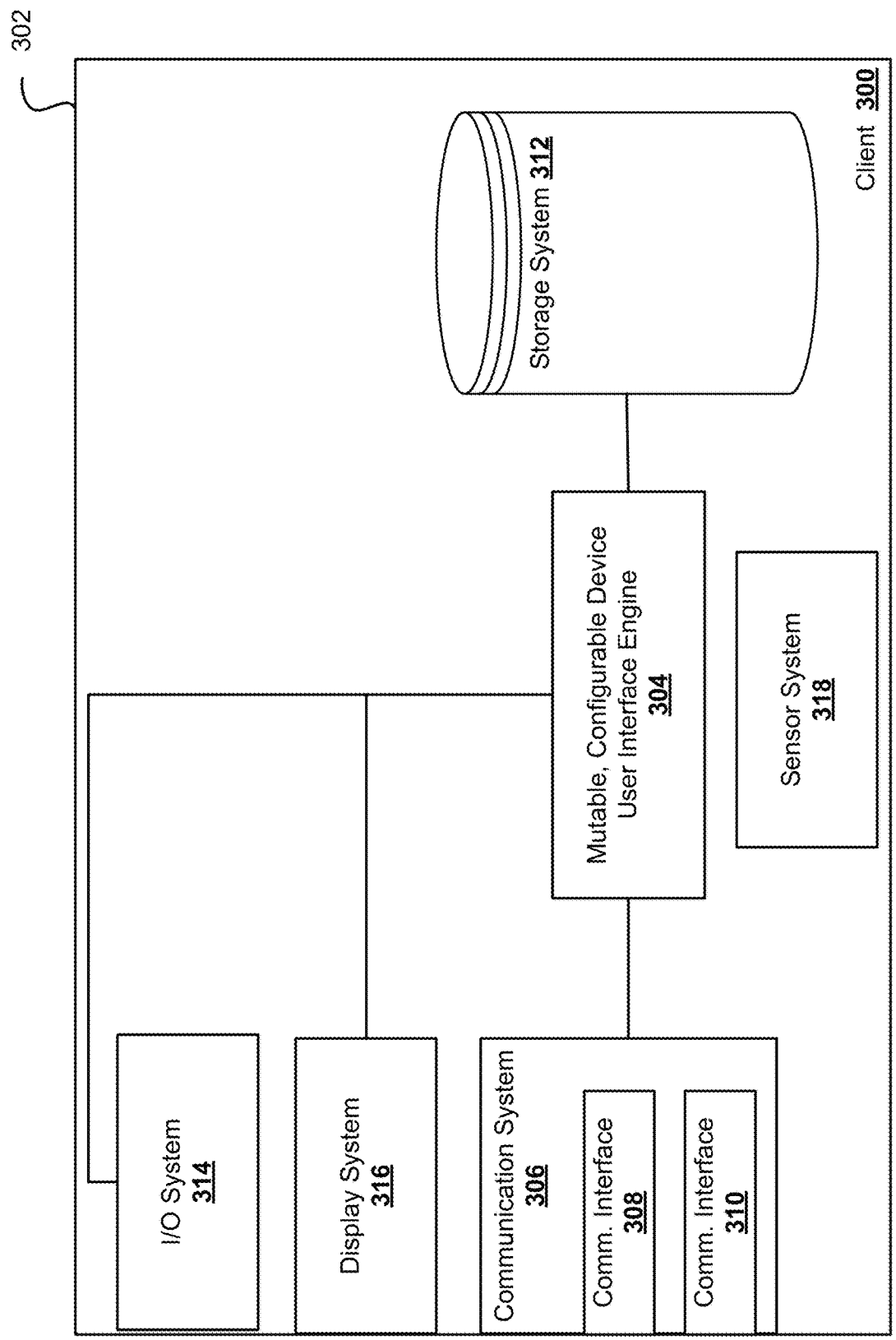
FIG. 3 illustrates a block diagram illustrating an example of a client computing device of the computing environment of FIG. 1, in accordance with some embodiments of the present disclosure.

An embodiment of client computing device 300 is illustrated in FIG. 3 that may be the client computing devices 14 discussed above with reference to FIG. 1, and which may be provided by a mobile computing device such as a laptop/notebook computer, a tablet computer, a mobile phone, or a wearable computer. In the illustrated embodiment, the client computing device 300 includes a chassis 302 that houses the components of the client computing device 300. Several of these components are illustrated in FIG. 3. For example, the chassis 302 may house a processing system (not illustrated) and a non-transitory memory system (not illustrated) that includes instructions that, when executed by the processing system, cause the processing system to provide a mutable, configurable device user interface engine 304 that is configured to perform the functions of the mutable, configurable device user interface engines or the client computing devices 300 discussed below. As such, the mutable, configurable device engine 204 may be the client application 14*a* of FIG. 1.

The chassis 302 may further house a communication system 306 that is coupled to the mutable, configurable device user interface engine 304 (e.g., via a coupling between the communication system 306 and the processing system). The communication system 306 may include software or instructions that are stored on a computer-readable medium and that allow the client computing device 300 to send and receive information through the communication networks discussed above. For example, the communication system 306 may include a first communication interface 308 to provide for communications through the network 104 as detailed above (e.g., first (e.g., relatively long-range) transceiver(s)). In an embodiment, the first communication interface 308 may be a wireless antenna that is configured to provide communications with IEEE 802.11 protocols (Wi-Fi), cellular communications, satellite communications, other microwave radio communications or other communications. The communication system 306 may also include a second communication interface 310 that is configured to provide direct communication with other user devices, sensors, storage devices, and other devices. (e.g., second (e.g., relatively short-range) transceiver(s)). For example, the second communication interface 310 may be configured to operate according to wireless protocols such as Bluetooth®, Bluetooth® Low Energy (BLE), near field communication (NFC), RFID, UWB, infrared data association (IrDA), ANT®, Zigbee®, Z-Wave® IEEE 802.11 protocols (Wi-Fi), and other wireless communication protocols that allow for direct communication between devices. For example, the communication interface 310 may include an RFID reader or writer or an NCF reader or writer.

The chassis 302 may house a storage device (not illustrated) that provides a storage system 312 that is coupled to the mutable, configurable device user interface engine 304 through the processing system. The storage system 312 may include any instructions, content, or data described herein and may share some of the databases with the storage system 208 of the server computing device 200 of FIG. 2.

In various embodiments, the chassis 302 also houses a user input/output (I/O) system 314 that is coupled to the mutable, configurable device user interface engine 304 (e.g., via a coupling between the processing system and the user I/O system 314). In an embodiment, the user I/O system 314 may be provided by a keyboard input subsystem, a mouse input subsystem, a track pad input subsystem, a touch input display subsystem, a microphone, an audio system, one or more cameras, a haptic feedback system, or any other input/output subsystem that would be apparent to one of skill in the art in possession of the present disclosure. The chassis 302 also houses the display system 316 that is coupled to the mutable, configurable device user interface engine 304 (e.g., via a coupling between the processing system and the display system 316) and which may be included in the user I/O system 314. In some embodiments, the display system 316 may be provided by a display device that is integrated into the client computing device 300 and that includes a display screen (e.g., a display screen on a laptop/notebook computing device, a tablet computing device, a mobile phone, an augmented reality glasses, a virtual reality headset, other wearable devices, or other devices that include a display screen), or by a display device that is coupled directly to the client computing device 300 (e.g., a display device coupled to a desktop computing device by a cabled or wireless connection).

The chassis 302 may also house a sensor system 318 that may be housed in the chassis 302 or provided on the chassis 302. The sensor system 318 may be coupled to the mutable, configurable device user interface engine 304 via the processing system. The sensor system 318 may include one or more sensors that gather sensor data about the client computing device 300, a user of the client computing device 300, the physical environment around the client computing device 300 or other sensor data that may be apparent to one of skill in the art in possession of the present disclosure. For example, the sensor system 318 may include positioning sensors that may include a geolocation sensor (a global positioning system (GPS) receiver, a real-time kinematic (RTK) GPS receiver, or a differential GPS receiver), a Wi-Fi based positioning system (WPS) receiver, an accelerometer, a gyroscope, a compass, an inertial measurement unit (e.g., a six axis IMU), or any other sensor for detecting or calculating orientation, location, or movement that would be apparent to one of skill in the art in possession of the present disclosure.

In various embodiments, the sensor system 318 may include an imaging sensor that may include an imaging sensor such as a camera, a depth sensing camera (for example based upon projected structured light, time-of-flight, a lidar sensor, or other approaches), other imaging sensors (e.g., a three-dimensional image capturing camera, an infrared image capturing camera, an ultraviolet image capturing camera, similar video recorders, or a variety of other image or data capturing devices that may be used to gather visual information from the physical environment surrounding the client computing device 300). The sensor system 318 may include other sensors such as, for example, a beacon sensor, ultra-wideband sensors, a barometric pressure sensor, one or more biometric sensor, an actuator, a pressure sensor, a temperature sensor, an RFID reader/writer, an audio sensor, an anemometer, a chemical sensor (e.g., a carbon monoxide sensor), or any other sensor that would be apparent to one of skill in the art in possession of the present disclosure. While a specific client computing device 300 has been illustrated, one of skill in the art in possession of the present disclosure will recognize that client computing devices (or other devices operating according to the teachings of the present disclosure in a manner similar to that described below for the client computing device 300) may include a variety of components and/or component configurations for providing conventional computing device functionality, as well as the functionality discussed below, while remaining within the scope of the present disclosure as well.

Figure 4:
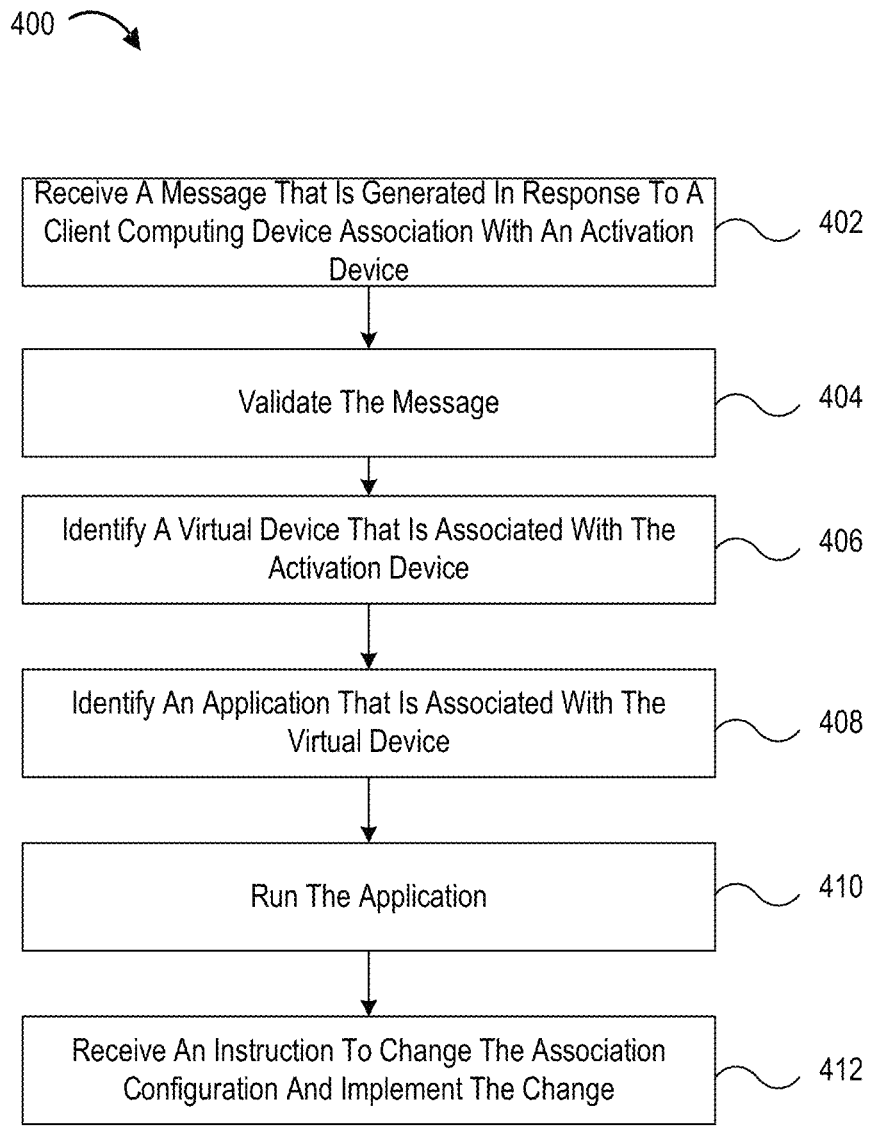
FIG. 4 illustrates a flowchart of a process of mutable, configurable devices, in accordance with some embodiments of the present disclosure.

In some embodiments, the server computing device 12, the client computing devices 14, or the activation devices 16 may execute a process 400 of FIG. 4, for example, by executing program code stored on a tangible, non-transitory, machine-readable medium. The illustrated operations may be executed in a different order, omitted, replicated, executed concurrently, executed serially, have additional operations inserted, all be automated, involve human intervention, or otherwise be modified relative to the arrangement depicted, which is not to suggest that any other description herein is limiting.

In some embodiments, the process 400 is illustrated in FIG. 4. The process 400 may begin at block 402 where a message may be received that is generated in response to a client computing device associating with an activation device. The message may include a client computing device identifier associated with a user of the client computing device and an activation device identifier for the activation device. In an embodiment at block 402, the mutable, configurable device engine 204 of the server computing device 200 may receive, via the communication system 206, a message. In block 404 the message may be validated. In an embodiment, at block 404 the mutable, configurable device engine 204 of the server computing device 200 may validate the message, the activation device 16, or the client computing device 300.

In various embodiments, the message may be received from the mutable, configurable device user interface engine 304 of the client computing device 300 via the communication system 306 and the network 20. A user of the client computing device 300 may use the sensor system 318 or the communication system 306 to scan an activation device 16. The activation device 16 may generate a message and received by the client computing device 300 via the sensor system 318 or the communication system 306. The message may be provided to the mutable, configurable device user interface engine 304. The mutable, configurable device user interface engine 304 may add a client handle such as a client computing device identifier for identifying the user of the client computing device 300. The message and the client handle may be provided, via the communication system 306, the network 20, and the communication system 206 to the mutable, configurable device engine 204 of the server computing device 200, which may validate the user and the activation device 16 using the client handle and the contents of the message.

For example, the activation device 16 may generate a secure unique NFC Data Exchange Format (NDEF) (SUN) message. The activation device 16 may include an NFC tag that may be programmed to respond with one of several types of responses when scanned. One type of response is to make available a record referred to as an NDEF record, and among the several types of NDEF records there is a type known as a Uniform Resource Identifier (URI). In the various embodiments, an implementation is discussed where the NFC tag makes available a specific type of URI known as the uniform resource location (URL) also known as a web resource, and a specific type of URL known as a web address or link comprised of a fixed and a variable portion, where the variable portion has been cryptographically obfuscated using advanced encryption standard (AES) cryptography, for example: https://192.168.1.100:3010/sparrow?d=273F04F46B214F11D91FDAF98E04E788&f=84CCC213F902DB5194B1B1A919CD2D92E24BBF1775D835B0ED23EC9A134413EF548743F38B304605938DECEA9F4C91EFFB301BB6FBB1BD3EE4CF2F6438B660&m=483D5AAB4B83BD2A The first part of this URL defines the protocol (https) and the hostname (192.168.1.100:3010) which are fixed. The user's client computing device 300 may direct the user to this host via an Internet Browser (such as Safari, Chrome, Firefox, etc.), or to an application associated with this host (e.g., the mutable, configurable device user interface engine 304). The backend service (e.g., the mutable, configurable device engine 204) hosted at this address uses the rest of the URL to formulate a response for the user. In the above example, this part is comprised of the route "/sparrow" and three query parameters: d=273F04F46B214F11D91FDAF98E04E788, f=84CCC213F902DB5194B1B1A919CD2D92E24BBF1775D835B0ED23EC9A134413EF548743F38B304605938DECEA9F4C91EFFB301BB6FBB1BD3EE4CF2F6438B660, and m=483D5AAB4B83BD2A. Where "m" is a cipher-based message authentication code (CMAC) which is used to verify the integrity and authenticity of the rest of the URL The mutable, configurable device engine 204 uses the route specifier "sparrow" to identify a group of NFC tags, which allows it to lookup a cryptographic key associated with this group, say k1, which it uses to decrypt the "d" query parameter to identify the specific tag that was scanned, through its unique ID (UID), and a counter value that is incremented each time the tag is scanned. This counter value may allow the mutable, configurable device engine 204 to identify duplicate and out of order scans, which may indicate an attempt to record the URL at one time and access the service later or to access it more than once using the same URL. Using the UID, the mutable, configurable device engine 204 may look up another key, say k2, that it uses to decrypt the "f" query parameter which contains a unique alphanumeric value, say x1, to verify the authenticity of the device, and checks the "m" parameter against the corresponding calculated value to establish integrity of the URL data. The unique alphanumeric value hidden in the "f" parameter, x1, may be known only to the mutable, configurable device engine 204, and is used to detect counterfeit devices. All unique data (UID, counter, x1) are obfuscated by cryptography which makes the query parameter values meaningless to anyone not in possession of the appropriate cryptographic keys and methods, keeping the activation device's identity, ownership, and configuration hidden. Note that the query parameters change every time the tag is scanned in a manner that only the mutable, configurable device engine 204 can unravel.

The specific example of the web resource NDEF record retrieved from an NFC device is one embodiment of how an activation device 16 may be realized. There are numerous other methods to affect the same or similar outcome. The key ingredients of an appropriate method are proximity or vicinity interaction, cryptography to affect privacy, security, to verify the activation device's authenticity, to rule out counterfeit and tampered with activation devices 16, and to prevent certain types of misuse, or the like. Such ingredients may be implemented using other type of records, other types of cryptography, including asymmetric key cryptography, other types of proximity devices, such as RFID (including UHF) tags, dual-frequency (HF & UHF) tags, BLE beacons, UWB devices, or other activation devices that would be apparent to one of skill in the art in possession of the present disclosure. Another method could be provided by encrypted data displayed in QR-code on a screen that changes after every use. While the above are examples of physical contact or activation devices, a virtual contact or activation device 16 may be an icon or another graphic in a website or an object in an AR/VR space associated with a cryptographically obfuscated token, such as a JSON Web Token, which serves the same purpose as the variable components of the web resource NDEF record discussed above.

The process 400 may proceed to block 406 where a virtual device that is associated with the activation device is identified, which is based on an association configuration and the activation device identifier. In an embodiment, at block 406, the mutable, configurable device engine 204 may use the activation device identifier or the client computing device identifier (which may be a user identifier in some embodiments (e.g., an identifier generated by the mutable, configurable device user interface engine 304 that is associated with a user account)) to determine a virtual device that is associated with the activation device 16. For example, the mutable, configurable device engine 204 may use the activation device identifier received to search the configurations database 224 for configuration 224a-224d that includes the activation device identifier. From there, the mutable, configurable device engine 204 may determine from a configuration file (e.g., configuration 224c) that includes the activation device identifier for the activation device that is associated with a virtual device in the virtual device database 214 (e.g., the virtual device 214d). In some embodiments, the client computing device identifier may also be used in addition to the activation device identifier to determine the virtual device associated with the activation device 16. Furthermore, in some embodiments, the client computing device identifier may be what determines the virtual device.

The process 400 may proceed to block 408 where an application associated with the virtual device is identified based on the virtual device and the association configuration. In an embodiment, at block 408, the mutable, configurable device engine 204 may identify, based on the virtual device and the association configuration, an application associated with the virtual device. For example, the configuration 224c that identifies virtual device 214d may also identify a mapping between the virtual device 214d and the application 222a. Examples of applications are discussed below (e.g., a loop application, a passport application, a lost device application, or other applications discussed herein or that would be apparent to one of skill in the art in possession of the present disclosure). An application, described herein, may be a sub-application of a larger application or a different configuration of an application. In some embodiments, instead of separate applications that could be associated with the virtual device, the virtual device themselves may include a fixed application that may be configurable based on a user, an owner's preference, other criteria discussed herein or other criteria that would be apparent to one of skill in the art in possession of the present disclosure.

The process 400 may proceed to block 410 where an application associated with the virtual device runs in response to the message. In an embodiment, at block 410, the mutable, configurable device engine 204 may cause the application or a portion of the application to run on a processor of the server computing device 12/200. The application may respond to the message such that instructions are sent back to the client computing device 14/300. The execution of the application may cause instructions to be provided to another client computing device that may be associated with an owner user of the virtual device or the activation device 16.

The process 400 may proceed to block 412 where an instruction to change the association configuration is received and performed. In an embodiment, at block 412, the mutable, configurable device engine 204 may receive an instruction to update the association configuration setting. As discussed above, the association configuration may include mappings between users, activation devices, virtual devices, and the applications. For example, an owner user may be an owner of one or more virtual devices, where each virtual device is associated with one or more applications. Each virtual device may be associated with one or more activation devices that the owner user may also own and control. The virtual devices, activation devices, or applications may also be associated with one or more participant users such that participant users may be permitted or blocked from using the devices that are associated and configured together. As such, virtual devices, users, activation devices, or applications may be swappable in various ways to achieve a desired configuration or a mutable configuration that changes according to conditions being met as described in example in the present disclosure.

For example, in various embodiments, an instruction to associate the virtual device with another application may be received. The application associated with the virtual device may be disassociated by updating the association configuration and the new application may be associated with the virtual device such that when a new message is received in response to a user being in proximity to the activation device associated with the virtual device, the new application may be presented.

In another example, an instruction may be received to disassociate the activation device from the virtual device. The mutable, configurable device engine 204 may disassociate the activation device such that if a client computing device forwards a message received by the activation device, the mutable, configurable device engine 204 will not identify the virtual device as being associated with the activation device, and thus, the associated application will not run. Similarly, other activation devices may be associated with the virtual device or the activation device that is disassociated may be associated with another virtual device.

In another example, the virtual device may be associated with more than one application and which application runs may be based on which user activates the associated activation device. For example, a message from a first client computing device may activate the first application (e.g., a configuration of an application or separate applications) while a message from a second client computing device may activate a second application. The association configurations may associate the applications based on user identifiers. In yet another example, the virtual device itself may be swapped with another virtual device or an owner associated with the virtual device, the application, or the activation device may be updated.

While the examples above describe the client computing device 14 communicating data or messages from the activation device 16 to the server computing device 12, other methods of securing the transfer of data from the activation device 16 to the backend service 12a may also be employed. One such method is out-of-band transfer, which means that the data from the activation device 16 may be transferred to the backend service 12a through a channel other than the client computing device 14. For example, the activation device 16, which may include some or all of the components for the client computing device 14/300 and may be connected to a home network, including directly or indirectly through other things in a network of things, which in turn may be connected to the Internet through a hub, for example, or the activation device 16 may have a direct connection to the Internet, such as through a cellular or satellite data connection. The data from the activation device 16 and additionally from the client computing device 14, including the client handle, could be relayed to the backend service 12a through this alternate channel. Such a transfer of data from the activation device 16 may not need cryptographic obfuscation since the client computing device 14 is never in possession of it. In some cases, the specific method of communication might employ cryptography as a general or optional means of obscuring all payload, regardless of whether the activation device 16 employed any cryptographic obfuscation.

The embodiment of the SUN message is one example, however, it lacks a parameter that may be critical to prevent a type of abuse. This parameter is the timestamp of when the activation device 16 is scanned. In the embodiment of the SUN message, a timestamp from the moment the client computing device 14 delivers the NDEF message to the client app 14a (e.g., the mutable, configurable device user interface engine 304), or from the moment the data from the client app 14a is received by the backend service 12a (e.g., the mutable, configurable device engine 204) is used. Under nominal circumstances, these two timestamps may be substantially the same. However, this method is not foolproof. A malicious actor may use another app on that actor's client computing device 14 to record the NDEF message, without sending it to the client app 14a, and therefore also, without sending it to the backend service 12a. The actor may send it to the client app 14a much later (e.g., an hour later), or the actor may try to send it to the backend service 12a directly through a malicious app. If no other scans of that activation device 16 were sent to the backend service 12a during this hour, the backend service 12a may not have any means of determining that the scan data had been recorded an hour earlier. Through the original SUN message, the backend service 12a may only have access to a counter to determine the sequence of scans. This scenario could be prevented if there is a method to determine the time when the activation device 16 was scanned regardless of when the SUN message was delivered to the client app 14a or to the backend service 12a. One method to affect this is to implement a clock in the activation device 16 and include the scan timestamp as an additional parameter in the SUN message. The timestamp parameter may be cryptographically obfuscated like other parameters in the SUN message, or it could be in the clear but covered by a signature, such as the one represented in parameter "c". Providing the timestamp at the activation device 16 requires the activation device 16 to be powered, which is practical for certain types of activation devices, and unrealistic for certain other types.

Another method of including the timestamp is to implement a scan event with a two-way exchange, where the client computing device 14 initiates the interaction by sending a timestamp to the activation device 16, which then includes it in the SUN message that it returns. A malicious actor can defeat this method by sending a future timestamp to the activation device 14. A robust method may be affected by creating the timestamp and a reference identifier to it in the backend service 12a, then sending this reference identifier to the client app 14a, which then uses the client computing device 14 to send it to the activation device 16, before the activation device 16 returns it in the SUN message. This reference identifier could itself be the timestamp obfuscated by cryptography using methods and keys known only to the backend service 12a, or it might be a type UUID that references the timestamp, or the like.

As discussed above, authorizations and allowances may be given to various users that may be recorded in the backend service 12a as various association configurations. The mutable, configurable device engine 204 may look up the associations using the client handle of the client computing device 14. However, authorizations and allowances may also be provided to authorized parties by other means, including, but not limited to, via signed tokens. For example, an authorizing party may specify authorizations and allowances in the form of dictionaries and key-value pairs in a JSON file conforming to an appropriate protocol or framework, sign a token with a private key, and send to the authorized party. This refers to asymmetric key cryptography that uses public-private key pairs. Signed tokens may be stored on the client computing device 14 and may be presented by sending them to the backend service along with the data received from a relevant activation device 16. Signed tokens may also be stored in a cloud repository or in a distributed database. Signed tokens may also be sent to the activation device 16 and verified locally.

In various embodiments, The act of scanning an activation device 16 may be meant to imply an interaction whereby data is exchanged between the client computing device 14 and the activation device 16 to accomplish various objectives, including, but not limited to, identifying the activation device 16, establishing its authentic and untampered status, establishing the sequence and or the time of the interaction, updating certain records in the activation device 16, authenticating the activation device 16, authenticating the client computing device 14, determining activation device authorizations, determining client computing device authorizations, or other objectives. While some examples of the process 400 are discussed above, one of skill in the art in possession of the present disclosure may realize other variations without departing from the scope of the present disclosure. The following will present several examples of applications that may run on this platform of mutable, configurable devices.

The Loop

Various methods of contacting others exist including post, telephone, email, Skype, WhatsApp, or other communication methods. Some communication methods direct communication at the person of interest, such as personal mobile phone numbers, personal email, and one-on-one Skype calls. Other communication methods direct communication at an object associated with the person of interest, such as a telephone number associated with a residence or mailing addressed to a business, or the like. There are many other ways to categorize methods of contact, such as by the ability to reuse the method, or by the owner's ability to control parameters of communication. Telephone contact, for example, is generally reusable. Once a user's phone number is known, another user can call them again using the same phone number. Most other methods in the above list are similar. For example, once a user's email address or their Skype handle is known, another user can contact them again using the same credential. Some of these methods, however, allow the contacted party to remove the contacting party from their contacts-list, after which the contacting party may not be able to contact the contacted party again, which is a crude type of control.

The loop may include a virtual device or virtual device-application pair that allows one party to contact and communicate with another party without having to exchange any contact information. Its functionality may be implemented in software within a client-server framework, while one or more cryptographically secure proximity devices, such as RFID, NFC, BLE, UWB, a virtual proximity device or the like, serve as contact points (e.g., activation points/devices 16 discussed above). These contact points (e.g., the cryptographically secure proximity devices) allow the backend service 12a to detect and manage various types of attempts of misuse, perform verifications to establish authenticity of the proximity device and to rule out counterfeit and tampered with proximity devices, and to lookup the ownership, functionality, features, settings, and owner's preferences. The cryptographic security features of the contact points serve important functions such that no identification or contact information of the owner or others with whom the owner may have shared the loop device is exposed to the contacting party, which means the contacting party may have no way of contacting the owner without going through the contact point each time the contacting party wishes to establish contact and communicate. While contact and communication may also be facilitated through contact points that do not implement strong security and or strong privacy, without them the practical utility of the loop would be severely limited.

The owner of the loop may have control over users that may contact the owner or when and how users may initiate contact. The owner may enable, disable, silence, or ready the loop at any time. The owner may set it up to require additional credentials before opening communication, and the owner may grant managed allowances to the contacting party to continue communication that was initiated through the loop later without it. Embodiments of the present disclosure below discusses several types of loop virtual devices to convey the scope of its utility. For example, the loop may include a door loop, a car loop, a generic owner's loop, a lost-objects loop, a loop for business, or any other loop that would be apparent to one of skill in the art in possession of the present disclosure.

Figure 5:
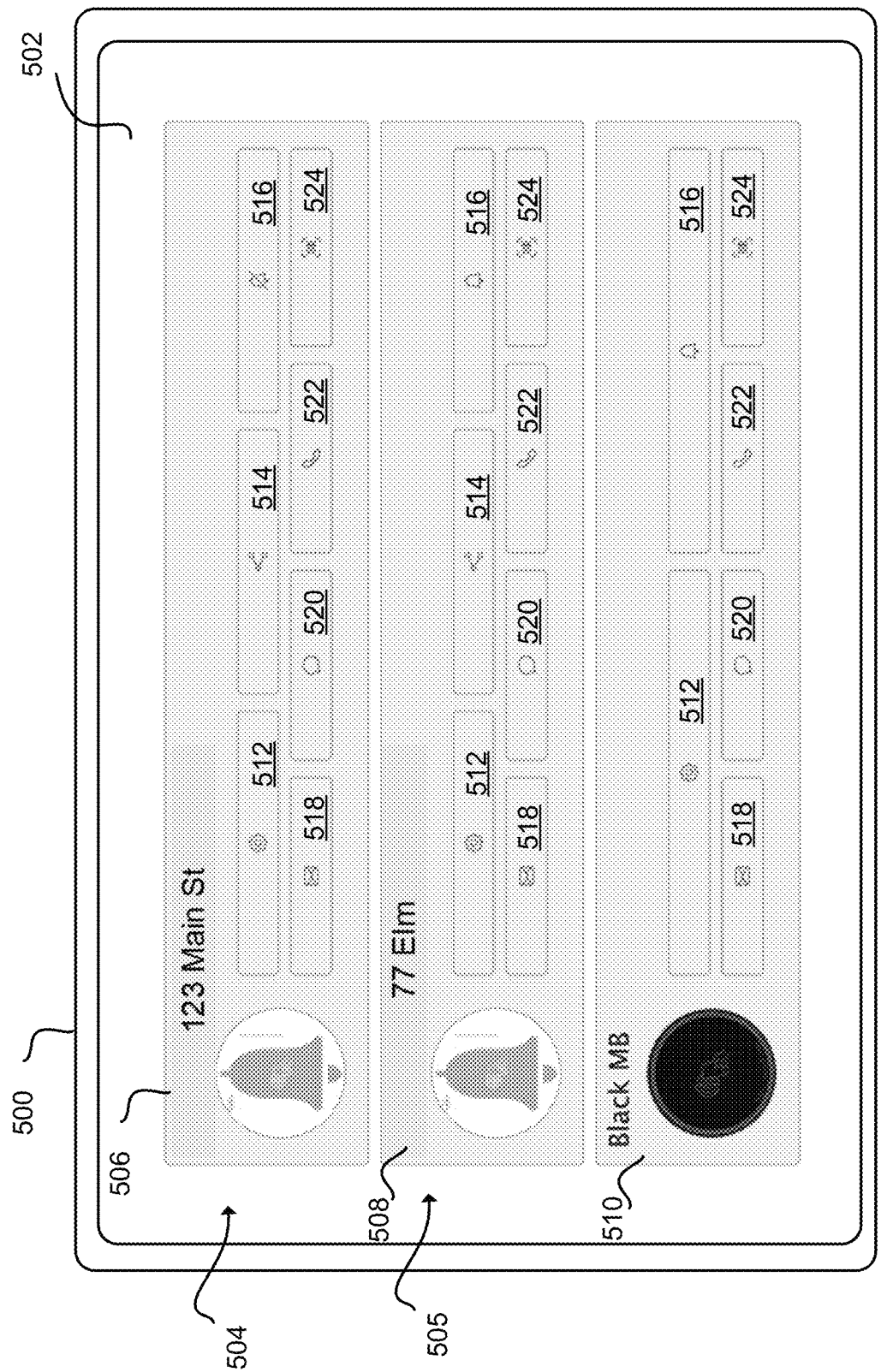
FIG. 5 illustrates a graphical user interface, in accordance with some embodiments of the present disclosure.

FIG. 5 illustrates a graphical user interface 504 that illustrates a list view of three loop devices (a loop 506, a loop 508, and a loop 510) as may be shown via a mutable, configurable device user interface engine 304 provided on a display device 502 of the owner's client computing device 500. From this view, an owner may access each loops' 506-510 configuration or settings (gear icon 512), its share grants interface (share icon 514), silence alerts & notifications (bell icon 516), access electronic mail threads (envelope icon 518), chats (chat icon 520), summaries of voice and video calls (telephone icon 522), and the list of all events (barcode icon 524) or whether any communication ensued associated with the loop. The three loops 506-510 in this view include two door loops (e.g., the loop 506 and the loop 508) associated with physical addresses, and one car loop associated with an automobile (e.g., the loop 510).

Figure 6:
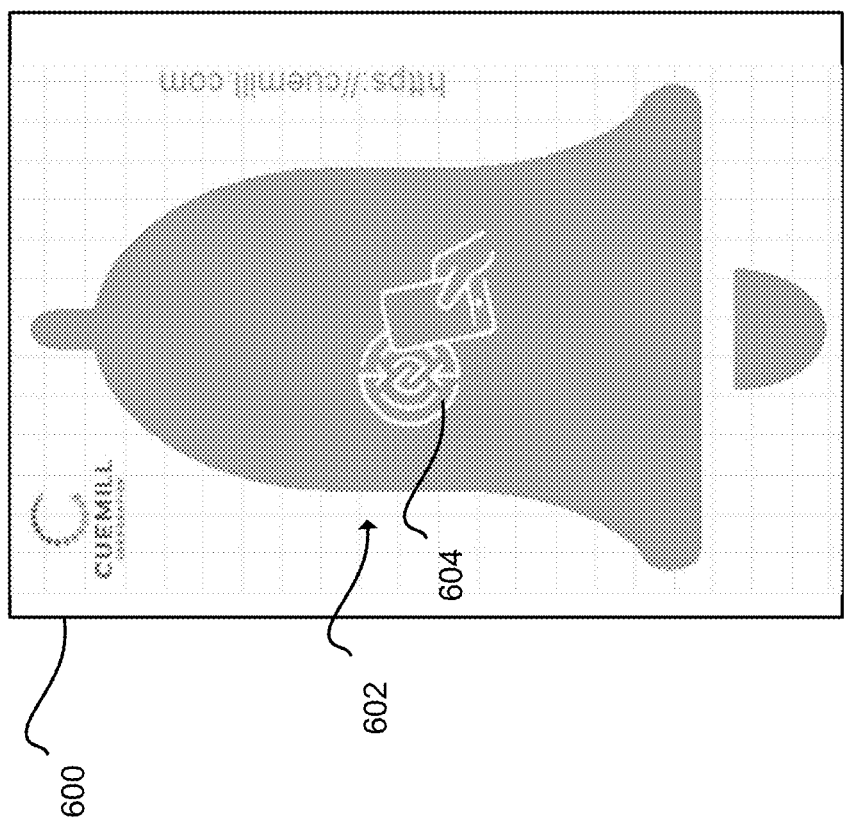
FIG. 6 illustrates an activation device, in accordance with some embodiments of the present disclosure.

A loop may be accessed through contact points. In one embodiment, the contact point may be a label, a window sticker, or another type of carrier, embedded with a secure communication inlay, where the carrier's design and or its artwork conveys its function. For example, an NFC inlay may include an NFC chip, an antenna assembled on a substrate which may include a clear plastic with or without adhesive. The NFC inlay may be combined with a label or other carrier to create a more durable and presentable NFC tag. For example, FIG. 6 illustrates a communication inlay 600, which may be the activation device 16, with artwork on a window sticker 602 embedded with a secure communication tag 604 that is meant to convey the notion of a doorbell. The centrally located NFC Forum's Wayfinding Mark 606 or an alternative graphic for NFC or other communication inlays that inform the visitor, that to access its function, the visitor must scan the proximity tag with the proximity reader in the client computing device 14. This specific type of activation device 16 may be referred to as a doorbelldevice. Note the distinction between the doorbelldevice, which is the activation device, and the door loop which includes the virtual device with which the doorbelldevice is associated. Finally, the placement of this doorbelldevice on or near the entrance of a location (e.g., a residence or a business) may reinforce its intended function.

Figure 7B:
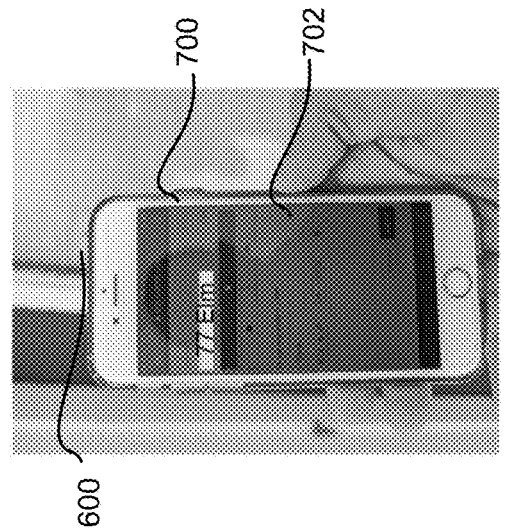
FIGS. 7A-7D illustrate a series of actions and graphical user interfaces of a process of a user interacting with the activation device of FIG. 6, in accordance with some embodiments of the present disclosure.
Figure 7D:
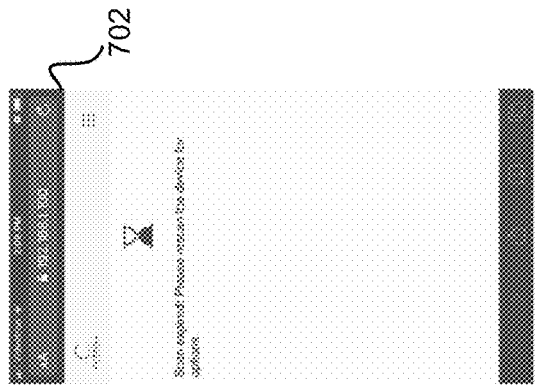
Figure 7A:
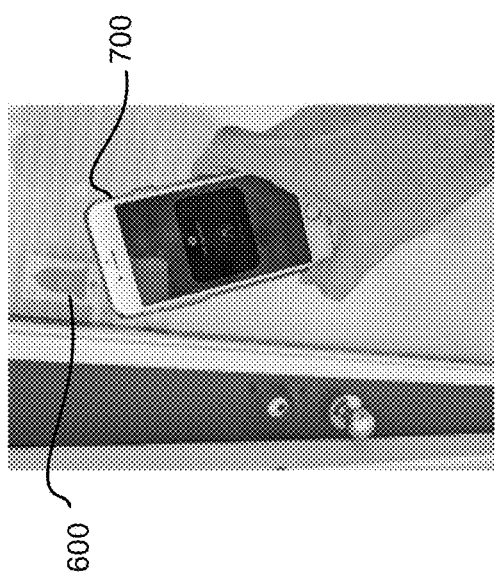

FIGS. 7A-7D illustrate an example use of the communication inlay 600 of FIG. 6. To access the door loop interface of the mutable, configurable device application, on a user computing device 700, the visitor may first select the proximity device reader function (e.g., an NFC reader function) or this function may be active by default, and scan the communication device inlay 600 (e.g., doorbelldevice). As illustrated in FIG. 7A, once the user has scanned the communication device inlay 600, and before the user is presented with a door loop interface 702 on the user computing device 700, several things may happen.

After establishing the integrity of uniform resource locator (URL) data obtained from the NFC scan, ruling out counterfeit and tampered with activation devices 16 and attempts of misuse, the backend service 12a proceeds to identify ownership, functionality, settings, and preferences associated with the associated door loop (e.g., loop 508 of FIG. 5), and formulates a response for the visitor. The successful response is to present the visitor with the door loop interface 702 in FIGS. 7B and 7C. Note that this door loop interface has additional components not available in traditional or modern video doorbells. Additionally, there are features implemented in the backend service 12a that are not visible on the interface. Embodiments of the present disclosure discuss components of the doorbell interface first, and some of the hidden features later.

The door loop interface 702 may include a title or identifier 704 assigned by the owner, such as the address it is associated with, "77 Elm." The door loop interface 702 may include a countdown timer 706 indicating the time left to activate the door loop, "2 min 19 sec." If the visitor does not activate the door loop within this countdown period (scan timeout), the scan expires, as illustrated in FIG. 7D. This prevents a certain type of misuse where the visitor may try to activate the door loop significantly after scanning the activation device (e.g., the communication device inlay 600) and possibly after moving away. The door loop interface 702 may include activation buttons such as, for example, a ring doorbell button 708, an initiate chat button 710, a video call button 712, or other buttons like a voice call button (not shown), secure entrance pin pad (not shown). The door loop interface 702 may include an electronic mail form 714 to post electronic mail, with the option to include attachments, such as images, videos, newsletters, flyers, or other functionality. The "Door Loop" interface may also present a secure entrance option, which could bring up a pin pad or a camera for facial recognition, for example, and in case of successful authorization, it may "actuate" unlocking of the door lock and or automatic opening of the door. In case of a multiplex, the door loop interface may first present a screen that asks the visitor to select the suite/unit and then access the door loop interface 702 of FIG. 7C for that suite/unit.

The door loop interface 702 options may be different for a visitor who is not a registered user of the host service ("guest"), versus one who is ("user"), versus one who is a contact of the owner ("contact"), or if he is logged-in as a private individual versus as member of a business, service organization, law enforcement, or any other tagged-based or group-based set of users.

The owner may deactivate the door loop by changing its settings appropriately which will flag it as deactivated in the devices list view, and display a deactivated message to anyone who scans the associated activation device (e.g., doorbelldevice or doordevice).

If the visitor were to access the activation device 16 during a time which the owner has marked "do not disturb", the doorbell interface 702 may show the custom "Do Not Disturb" message setup by the owner, and may or may not offer reduced functionality, such as the ability to post electronic mail or flyers only, depending on the configuration of the loop device.

Also, before presenting the door loop interface 702, the owner may require that the visitor share his location. This feature may prevent another type of misuse where the activation device may have been moved away from its intended location, such as when it is vandalized or stolen. If the visitor refuses to share his location or if his location does not match the location of the activation device setup by the owner, the backend service 12a may not present the door loop interface 702, instead the visitor might see a message indicating why the door loop interface 702 is not presented.

Figure 7C:
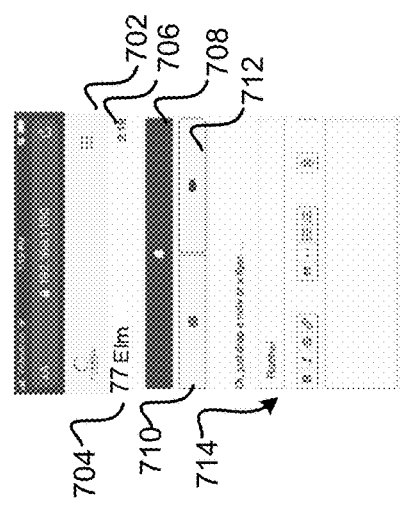
Figure 8:
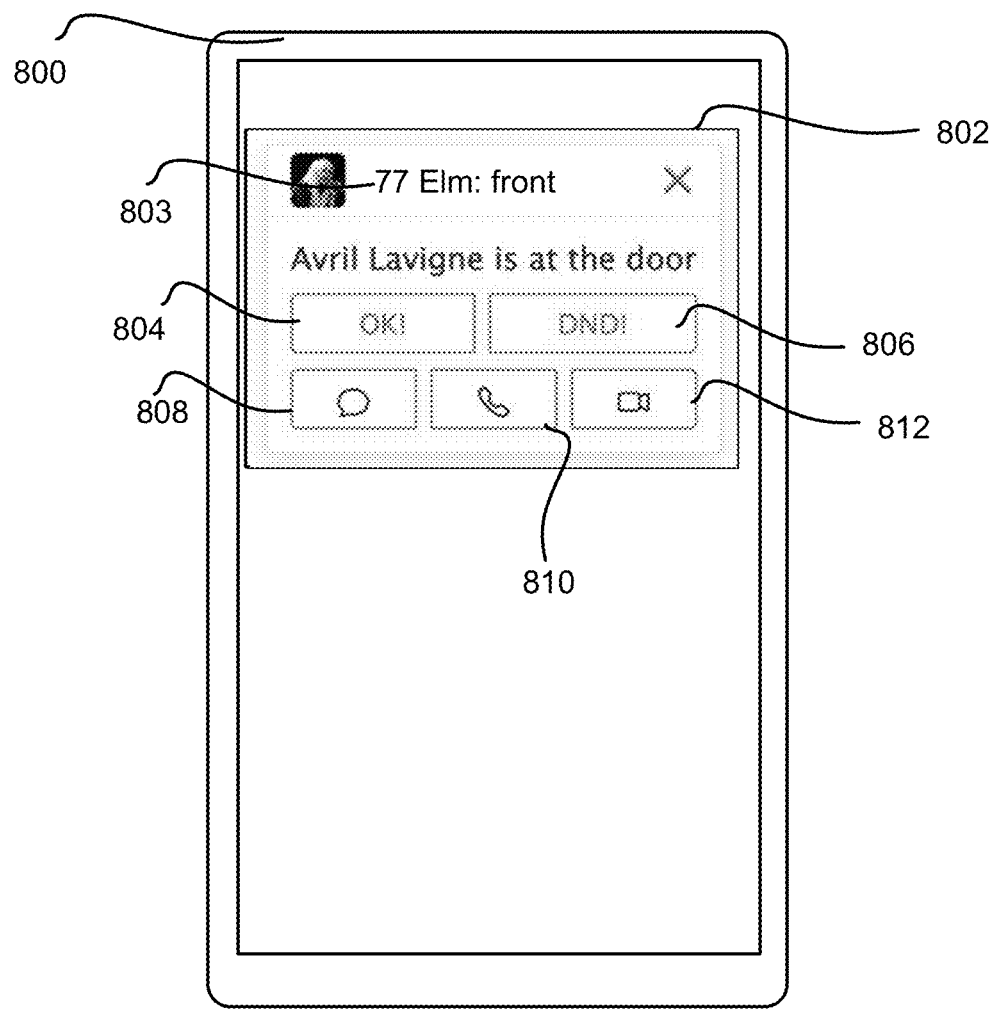
FIG. 8 illustrates a graphical user interface, in accordance with some embodiments of the present disclosure.
Figure 10:
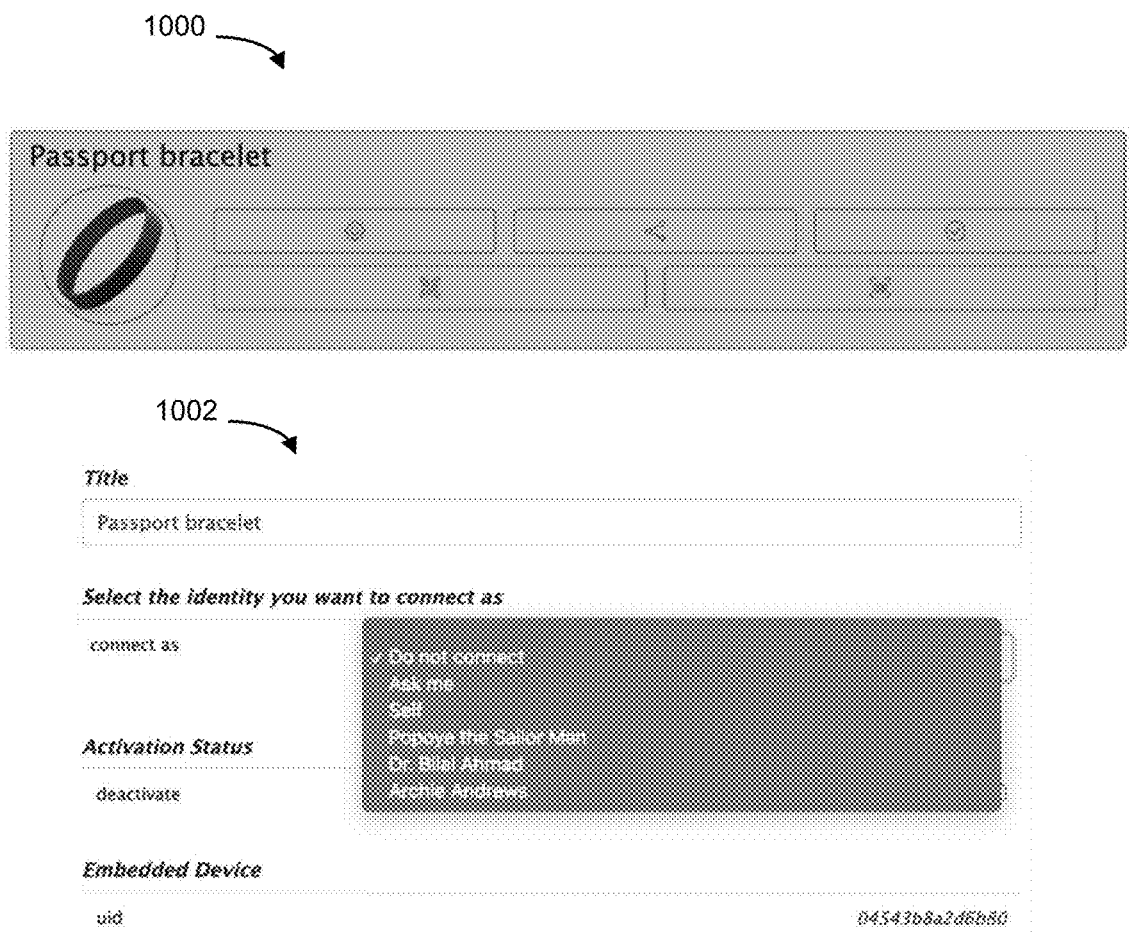
FIG. 10 illustrates a graphical user interface, in accordance with some embodiments of the present disclosure.

FIG. 8 illustrates an example owner user computing device 700 following the example of FIGS. 5, 6, 7A, 7B, and 7C. Once the visitor activates the ring bell button 708 of FIGS. 7B and 7C, the owner is notified by an alert 802 on a client computing device 800 (e.g., client computing device 14/300) or on multiple devices as per preferences associated with the owner. In this embodiment of the alert 802, the alert 802 may include a title 803 indicating the door loop and the activation device 16 that was triggered (e.g., "front"). The owner may have several choices. The owner can click "OK!" button 804 to indicate that the owner will be at the door momentarily, or the "DND!" button 806 to indicate that owner does not want to be disturbed at this time. The owner can also respond by initiating a chat 808, a voice call 810, or a video call 812 with the visitor.

In various embodiments, the door loop application may implement a service such that when the owner initiates a video call, the visitor is simply brought into the call without presenting the owner with a prompt to accept or decline. However, if the visitor initiates a video call request, the owner may have a choice to accept or to decline it.

While the visitor is waiting for the owner to respond to the alert, the visitor may see the awaiting answer status, which includes an option to cancel the activation, which, if selected, immediately dismisses the alert(s) 802. The awaiting answer status may have its own countdown timer (ring timeout) which is the time after which the alert(s) 802 will be cancelled automatically.

If the owner does not take any action in response to the alert(s) 802, and once the ring timeout has expired, the visitor may see a status relaying to the visitor that the owner is not at home or is not available.

The visitor may also activate other door loop buttons, such as to start a chat (e.g., the chat button 710), or to request a voice or video call (e.g., video call button 712), or the visitor may simply post electronic mail using the form 714 in the doorbell interface 702 of FIG. 7C. A successfully posted electronic mail may be acknowledged by a confirmation screen.

FIG. 9 illustrates one example embodiment of the door loop configuration or settings interface 900 where the owner may specify various preferences such as a title, answer as (self or another made-up identity). The door loop configuration may be one of the configurations 224a-224d stored in the configurations database 224. Several doorbelldevices or doordevices (e.g., activation devices 16) may be associated with one door loop (e.g., virtual device). In the example shown here there are two doorbelldevices associated with the door loop, one titled "front" which may refer to its location at the front entrance, and the other titled "rear" which may refer to its location at the rear entrance of the house. The owner may have the option to deactivate the door loop from the door loop configuration or settings interface 900 as well as to deactivate each doorbelldevice individually from the doorbelldevice settings. When a visitor activates a door loop that has more than one activation device associated with it, the owner may be informed of the specific activation device that has been activated. For example, in the alerts 802 of FIG. 8, the door loop's title 803 is qualified by the title of the activation device that was activated, "front".

The "who can initiate" configuration options may allow the owner to present different door loop interface options to visitors based on whether the visitors are registered users of the service ("users") (e.g., users of user identifiers 218a-218d) or not ("guests"), and whether the visitors are on a contacts-list ("contacts") associated with the owner.

The "answer as" setting mentioned above may provide the owner the option to answer the door loop either using his real identity as defined in his account profile, or through a made-up identity of his choosing, such as "homeowner", "resident at 77 Elm", a pseudonym such as "Popeye the Sailor Man", or the like. This is a privacy feature; the visitor will see the name associated with the "answer as" identity if the owner responds to the visitor.

In various embodiments, the owner of the virtual device (e.g., door loop) may share the door loop with the owner's contacts. For example, the owner may share it with other members of the household, or even with a friend or relative who can answer the door remotely when the owner or other residents are not available to do so. The share or permissions functionality is achieved by way of "grants". There are several types of "grants" available, such as "answer", "change configuration", "delete", etc.

If the owner shares the door loop with another user, that user may receive a notification to accept or decline the share. If the user accepts, a "shared" door loop may be created designated by a "shared" flag. The owner may later revoke one or more share grants. If the owner revokes all grants, then the shared loop is flagged "revoked", and is no longer functional.

With the "answer" grant, the grantee becomes a receiver of the door loop, which means that when a visitor activates the door loop, in addition to the owner who is a receiver by default, the grantee is also notified. The grantee may configure the shared door loop preferences independently of the owned door loop preferences. The owner may share the door loop with any number of grantees, and he may provide them with the same or different grants.

When a visitor activates an activation device associated with a door loop with multiple receivers, then all receivers (unless they have configured their corresponding door loop, owner or shared, to not alert them) will receive the door loop alert. Any one of the receivers may then answer the door loop, and as soon as one receiver answers it, other receiver's alerts are dismissed automatically. If one receiver responds with a "DND!" answer, the visitor continues to see the awaiting answer status until either all receivers have responded with a "DND!" answer or the ring timeout has expired. If one receiver starts a chat with the visitor, other receivers can also join in.

A visitor who is already on a receiver's contacts-list may initiate communication with this receiver directly without activating the doorbelldevice, for example. But most visitors are unlikely to be on the receivers' contacts-list. The receivers may have control over who may contact them through the door loop, how they may contact them, and how long after, how many times, and how far away from the doorbelldevice may they contact them after scanning it. This is achieved through various logical means implemented in the mutable, configurable device engine 204 and configured by settings and preferences. Further functions of the door loop application may include: (1) The visitor may select the unit or suite number, ring the bell, initiate chat, make a call request, post electronic mail, or access a secure entrance interface once after scanning the door loop activation device, and before the scan timeout. The visitor may not ring the bell again, initiate another chat, make another call request, post additional electronic mail, or access the secure entrance interface again without scanning the doorbell device again. (2) The data generated from a scan may be used only in the order of the scan. (3) Any chat initiated through the door loop interface may be set to expire or be deactivated after a certain period from when the activation device is scanned or activated, for example 10-minutes after, or after some other predetermined time since the owner last messaged on the chat, or after the visitor has exhausted his or her quota of messages allowed by the owner or another receiver. (4) Since the data record obtained from the door loop activation device is cryptographically obfuscated, which can only be decrypted by the door loop application using the appropriate keys and methods in its possession, the visitor does not have access to the receivers' identity, contact information, or the features, settings, preferences, grants, or the like, associated with the door loop.

After a visitor has posted electronic mail through a loop device, the visitor may lack a way of sending additional communication without going through the contact point/activation device 16 again, which requires the visitor to be in its proximity. However, once the owner has received doormail or chat message, the owner may want to contact the visitor, but also restrict the visitor from sending unwanted additional mail or chat message, or unwanted type of mail or chat message. For example, for a doormail or chat message that includes a service offering which might interest the homeowner. The owner may wish to reply to the visitor to discuss the offer, but the owner may also want to prevent the visitor from being able to send the owner repeated offers or other mail or messages unrelated to the grass-cutting service. At the same time, the visitor may wish to limit replies from the homes at which the visitor posted service offering in some way. For example, the visitor may like to limit the reply period to 2 months, which might coincide with the end of spring and start of summer, and when the visitor expects to be fully employed and no longer in need of additional work.

To achieve this, a reply-quotas may be introduced. For posted mail or chat message, such as doormail or chat message posted through the door loop, a reply count and reply period may be set. If this were the visitor's preferences, this would mean that the homeowner can respond to the visitor's doormail or chat message, for example, three times over two months or some other count and period, and then no more. In a similar fashion, when the owner of the door loop responds to the visitor, the owner may assign a reply-quota to the owner's reply on a per mail or message basis to continue the exchange in a controlled manner. For example, the owner may allow the visitor to send him one reply within 2 weeks of his.

While the example above discusses a door loop, which is one type of loop (e.g., virtual device), and while the door loop may be associated with a place of residence or business, the generic owner's loop may be appropriate in other scenarios. For example, an owner's loop may be easily associated with just about any object, and not just a place of residence or business. For example, an owner's loop may be associated with an automobile by sticking an activation device 16 on the inside of one of the windows of the automobile; an owner's loop associated with an automobile may be referred to as a car loop because it may afford some functionality that is specific to this use case. Anyone may scan this activation device 16, (e.g., a sticker embedded with a proximity device) to access a graphical user interface to contact and communicate with the owner or other receivers with whom the owner may have shared this car loop in much the same way as the visitor would access the door loop. The visitor may request a chat, voice, or video call or post electronic mail if the owner has setup the car loop configuration to allow such methods of communication. For example, the owner may configure the loop to allow guest visitors to either initiate a chat or to post electronic mail, but they may not request a voice or a video call. The car loop interface may include an additional activation option, which may be referred to as a "honk" option, and whose purpose is to communicate to the owner that the owner is being requested to move the owner's vehicle now as it may be blocking the visitor's way. This is a common need in many Asian countries where city streets are narrow, and vehicles are routinely parked in blocking patterns.

While an owner's loop activation device may be associated with an object, such as an automobile, bicycle, storage unit, or the like, the owner's loop activation device 16 may also be embedded or integrated within an object, such as in a toy, in sporting gear, in articles of clothing, and in just about any object. In such cases then, the object itself becomes the carrier of the activation device 16, and we qualify such an owner's loop activation device as an embedded activation device 16 as distinct from an associated activation device 16 in certain ways.

The associated activation devices 16 may be removed from the object of association and associated with another object. The owner might also, optionally, want to create another loop to associate the activation device 16 with, and as such, it is desirable to provide an ability to disassociate the activation device 16 from one loop (e.g., virtual device) and associate it with another. In contrast, an embedded activation device 16 cannot be removed from the object in which it is embedded. As such, there may be a scenario where the owner of the object might want to sell or gift the object, and therefore also want to transfer the embedded activation device 16 to the new owner. The owner may also want to transfer the ownership of a removable activation device. For removable and embedded activation devices, therefore, an additional set of modes may be implemented. For example, four additional modes for an owner's loop activation device may be implemented. In "open" mode, any registered user may scan the device, and set it up as their own. In the "security code" mode, any registered user may scan the device, provide the correct security code setup by the previous owner, and then set it up as their own. In the "request transfer" mode, any registered user may scan the device and request transfer of ownership, which if they do, will notify the current owner who may allow or decline. Finally, there's the possibility of one losing a removable activation device or an object containing an embedded activation device. In such a situation, the owner can mark the activation device as lost. Marking an activation device "lost" temporarily disassociates it from its virtual device (e.g., the owner's loop) and associates it with another virtual device (e.g., a lost-objects loop). In other embodiments, another application or software function may be associated with the virtual device that is associated with the owner (e.g., the owner's loop) when the activation device is marked lost.

The lost-objects loop is a type of loop or application that is specifically designed to handle lost objects. When a user scans the lost activation device or the embedded activation device in a lost object, that user may immediately see that the object has been marked lost by its owner. In addition, the user may see a custom message from the owner, and have one or more methods of contacting the owner, as configured by the owner. While here a lost-objects loop is introduced in the context of a lost removable activation device or an embedded activation device where the carrier object may have been lost, the notion of marking a removable activation device or an embedded activation device lost (essentially marking the carrier object lost) applies to many types of activation devices and not just an owner's loop activation device.

One of the key ingredients of a contact point (and more generally, an activation device) is its unique identifier which allows it to be associated with a corresponding virtual device. As discussed above, another virtual device, or application associated with a virtual device is the passport, discussed in further detail below, may combine functionality from the presenter and action classes. The activation device for the passport may similarly be marked "lost". Like the owner's loop activation device, when an activation device for the passport loop is marked lost (essentially marking the carrier object lost), it is temporarily disassociated from its nominal virtual device (whose purpose may have been to present credentials, for example), and associated with a lost-objects loop. Note that a passport device is not setup to enable contact and communication, systems and methods of the present disclosure provide to logically convert it into one by associating it with a loop virtual device to address a need.

This ability to convert any activation device into a loop activation device has wide-ranging applications. For example, consider the scenario where a user loses a credit card. The credit card is embedded with a secure proximity device, which is a smartcard with a secure element, which can provide cryptographically obfuscated data that can be used by a backend service 12a, such as the mutable, configurable device engine 204 of FIG. 2, to identify and authenticate it. In the context of the present disclosure, this makes the credit card a suitable candidate to be associated with a lost-objects loop, while disabling its primary function of making payments, when it gets lost.

In some embodiments, when the owner scans the activation device or the object with an embedded activation device that the owner had previously marked lost, the mutable, configurable device engine 204 automatically disassociates the activation device from the lost object loop or application, and associates it with the original virtual device or application that it belonged to before it was marked lost.

In another embodiment, the owner's loop activation device may be designed to receive electronic proximity mail as its primary function. As such, the virtual device may be associated with an electronic proximity mail application (e.g., one of the other applications 222a-222d. Such an activation device 16 could be applied to each mailbox in a community mailbox group, in a post office PO Box group, to the mailbox at or near a residential entrance. The corresponding loop may be setup to present an interface that allows electronic proximity mail to be received as its primary offering, and may or may not offer additional functions, such as ring, chat, and call.

In another embodiment, the loop activation device 16 may be embedded with a cryptographically secure UHF RFID tag, such as a radio frequency identification (RAIN) RFID tag, which can be read from up to 100 feet. Such an activation device 16 may be applied to houses in such a way as to face the road and may be scanned from a moving vehicle. The loop functionality of receiving proximity mail could be automated for authorized senders such that mail can be delivered from a moving vehicle, while the owner of the loop retains control over who might deliver such mail to his or her loop device. Such a scenario may be attractive for distributing electronic mail flyers for community newsletters or the like.

In another embodiment, a UHF or dual-frequency activation device may be used on the windshield or license plate of an automobile in the same way as toll tags are used but provide multiple functions, from the receiver and presenter classes. For example, the associated virtual device may be configured to allow service providers such as drive-thru businesses to scan the activation device (using a UHF RFID reader) and call the driver once to take the driver's order without having access to the contact credentials or knowing the driver's identity (e.g., receiver class functionality). This virtual device may be configured, additionally, to present access credentials at restricted parking access points, to make payments at toll crossings, or the like (e.g., presenter class functionality). For added security, the UHF feature may be disabled in the backend service when the associated windshield or license plate mounted activation device is scanned not in the vicinity of an authorized service provider.

In another embodiment, the activation device 16 may be attached to an article of clothing, such as next to the manufacturer's label on a jacket or shirt, or it may be embedded within the article. Such an activation device 16, could also be made with a dual frequency tag enabling multiple functions: owner's loop contact point, store inventorying, and to locate stolen objects.

In another embodiment, the loop activation device 16 may be embedded in an artwork, whereby it can serve as a contact point for the artist, curators, owners—past or present, art historians, auction houses, or the like. Such a setup may provide an artwork's provenance and allow the various parties noted above to communicate should they choose to.

In another embodiment, the activation device 16 may be realized using a BLE beacon device. Such an activation device 16 can be scanned by a smartphone from up to 100 feet or more, and therefore the associated loop could be accessed from the driveway of a home or even the curbside. Additionally, it may be accessed by one's neighbors from the comfort of their homes.

In another embodiment of the present disclosure, the contact point may be a combination of one or more devices: a regular doorbell pushbutton, a video doorbell, an NFC activation device, a UHF RFID activation device, a UWB activation device, a BLE beacon activation device, or other activation device that would be apparent to one of skill in the art in possession of the present disclosure.

In another embodiment, additional features may be allowed for public service personnel (such as the parking enforcement police to access the car loop or the owner's loop through its activation device 16 associated with an automobile, a bicycle, or any other vehicle that would be apparent to one of skill in the art possession of the present disclosure) to contact the owner without express authorization by the owner.

In another embodiment, the owner of an owner's loop may be an organization, such as a private club. Such an owner might configure the loop to receive activations from its members differently than activations by non-members.

In another embodiment of a receiver class device, the activation device 16 and its corresponding virtual device and application may act as a building intercom or access control system. In this embodiment, the configuration and preferences of the receiver virtual device are partly controlled by the owners and or residents of the individual suites and partly by the building management, concierge, or security. For example, in addition to facilitating contact from visitors—as in the case of a door loop, this setup can facilitate secure and frictionless access for food delivery personnel to enter the building and to access the elevator at the appropriate time and to the appropriate floor, while satisfying authorization and logging requirements of all concerned parties: owner, resident, and building management. As such, in some embodiments, the activation device 16 may be associated with a security device (that may include some or all of the components of a client computing device 14) that may include a communication system that is configured to communicate with the server computing device 12 or a client computing device 14 such that when the application associated with the virtual device verifies a visitor, the application can communicate a signal to the security device (e.g., a lock, an access controller, or the like) to permit access to the visitor (e.g., unlock a door).

The Passport

While the loop described above may provide one or more types of applications 222a-222d, other applications may be associated with a user, an activation device, or a virtual device. The following presents a "passport" application. It is common practice to employ smartcards for identity credentials and payments, and embedded NFC tags for business cards, loyalty, access, or the like. Sometimes a smartcard or an NFC tag or similar technology in one carrier vehicle serves multiples purposes, such as in a smart ring that may be used for payments, access, loyalty, or other functions. There are some key ingredients that are needed to realize the various use-case scenarios. Loyalty cards may require a simple identifier, access cards may also require a simple identifier but one that is cryptographically obfuscated. Identity and payment cards may necessitate additional complexity to affect biometric authentication, or to handle off-line usage.

As discussed above, classes of devices were introduced that may be created within the framework discussed above. The passport virtual device combines some features from the action class and some from the presenter class. The passport owner may have complete control over what action is performed when the associated activation device is activated and by whom, including no action, and what credentials and or proofs may be presented. In addition, the owner may setup the passport to require certain authentications and authorizations and potentially something in return when providing proofs and credentials to the other party. The activation device 16 may be embedded in a wearable such as a bracelet, or in a standard sized card that one may carry in their wallet, as a sticker on their mobile phone case, or even virtually in their smartphone.

In various embodiments, the passport that implements a small set of functions from the two classes: to make connections (e.g., to add someone to their contacts-list (action class)), and to present proofs such as a virtual contact file (VCF) or also known as vCard, health insurance credentials, membership subscription, or loyalty credentials (presenter class). The passport may be associated with an activation device 16 that is a proximity device embedded in a carrier object such as a bracelet, a pin, or the like.

After establishing the integrity of URL data, ruling out counterfeit and tampered with devices, and attempts of misuse, the mutable, configurable device engine 204 may proceed to identify ownership, functionality, settings, and preferences associated with the associated passport (virtual device), performs appropriate actions, and formulates a response for the activating party.

The following presents a few examples of how the passport may be configured, and what happens when the associated passport activation device is activated or scanned. For example, the scanning party may be an individual whom the owner of the passport has just met, and the scan action adds this person to the owner's contacts-list as well as presents him with the VCF; or the scanning party may be a health clinic, and the scan action presents the clinic with the owner's health insurance credentials, medical history, and any prescriptions that the owner might be on at present; or the scanning party may be a bookstore, and the scan action presents the bookstore with his loyalty membership and payment credentials, or the like.

10 illustrates a passport virtual device 1000 in the devices list view on the owner's client computing device 14. From this view, the owner may access the passport's configuration or settings (gear icon), its grants interface (share icon), disable or enable the device (checkmark icon), create an on-screen activation point (QR-code icon), and access the list of all scan events (barcode icon) associated with the embedded passport activation device.

The configuration or settings view 1002. The action function associated with this passport activation device is to connect with the scanning party. The owner can configure this function to do nothing ("Do not connect"), to prompt him to decide how to connect ("Ask me"), to connect as the owner's real identity as defined in his account profile, or to connect through one of the owner's assumed identities (e.g., Popeye the Sailor Man, Archie Andrews, or Dr. Bilal Ahmad). The owner may also deactivate the passport activation device.

In various embodiments, "users" refers to registered users of the service. The non-registered users of the service may be referred to as "guests." The owner may permit different grants to the two groups. For example, a registered user scanner of the owner's passport activation device may be presented with the owner's "social" vCard/VCF that owner has configured for social situations. If none of the requisites is selected, there is no requirement for the scanner to share any credential in return.

If the owner has setup the "connect as" setting to "Ask me", and the share grants for registered users to present his social vCard/VCF, when a registered user of the service scans this passport activation device, the scanner is presented with a message that informs the scanner that the request for connection has been registered, and that scanner can also download the owner's social vCard/VCF. Meanwhile, the owner may receive a notification to accept or decline the request to connect, and if the owner decides to connect, the owner can choose to connect as "self", e.g., using the owner's real identity as defined in an account profile, or through one of the owner's assumed identities.

If the owner has configured the "connect as" setting to "self" and the owner has revoked share grants for registered users from sharing the vCard/VCF to not sharing anything, a registered user scanner will be immediately added to the owner's contacts-list, and the scanner will be presented with a message confirming the same.

If the owner has set "connect as" setting to anything but "do not connect", and the passport is scanned by someone who is not logged-in to the service, the scanner may see the message that the connection request is pending till the scanner logs in. After the scanner logs-in, the connection request may be processed. If the owner had set "connect as" to "ask me", the owner will get a notification, as in the previous example; otherwise, the connection will be made without any further action.

In another example, if the owner were attending a professional symposium, for instance, he might want to configure the passport to connect as a professional identity and setup the share grants for both users and guests to share his professional vCard/VCF.

When a colleague, who is a logged-in user of the service, scans a passport activation device at the symposium the colleague may be added to the owner's contacts through the owner's professional persona, (e.g., Dr. Bilal Ahmad), and the colleague may then also be presented with the owner's professional vCard/VCF. Note that the owner may share a vCard/VCF without asking for anything in return. However, the owner may request that the scanner also share the scanner's vCard/VCF, a LinkedIn profile, or other social media profile.

The above scenarios show some use cases where the passport activation device and virtual device is used in a person-to-person context. However, it may also be used to make payments or to present credentials at other points. What the passport does is determined by several factors, including its settings, grants, and requisites, point of contact, scanner's account's associations (such as an individual, business, service provider, etc.), authorizations, and settings.

Figure 11:
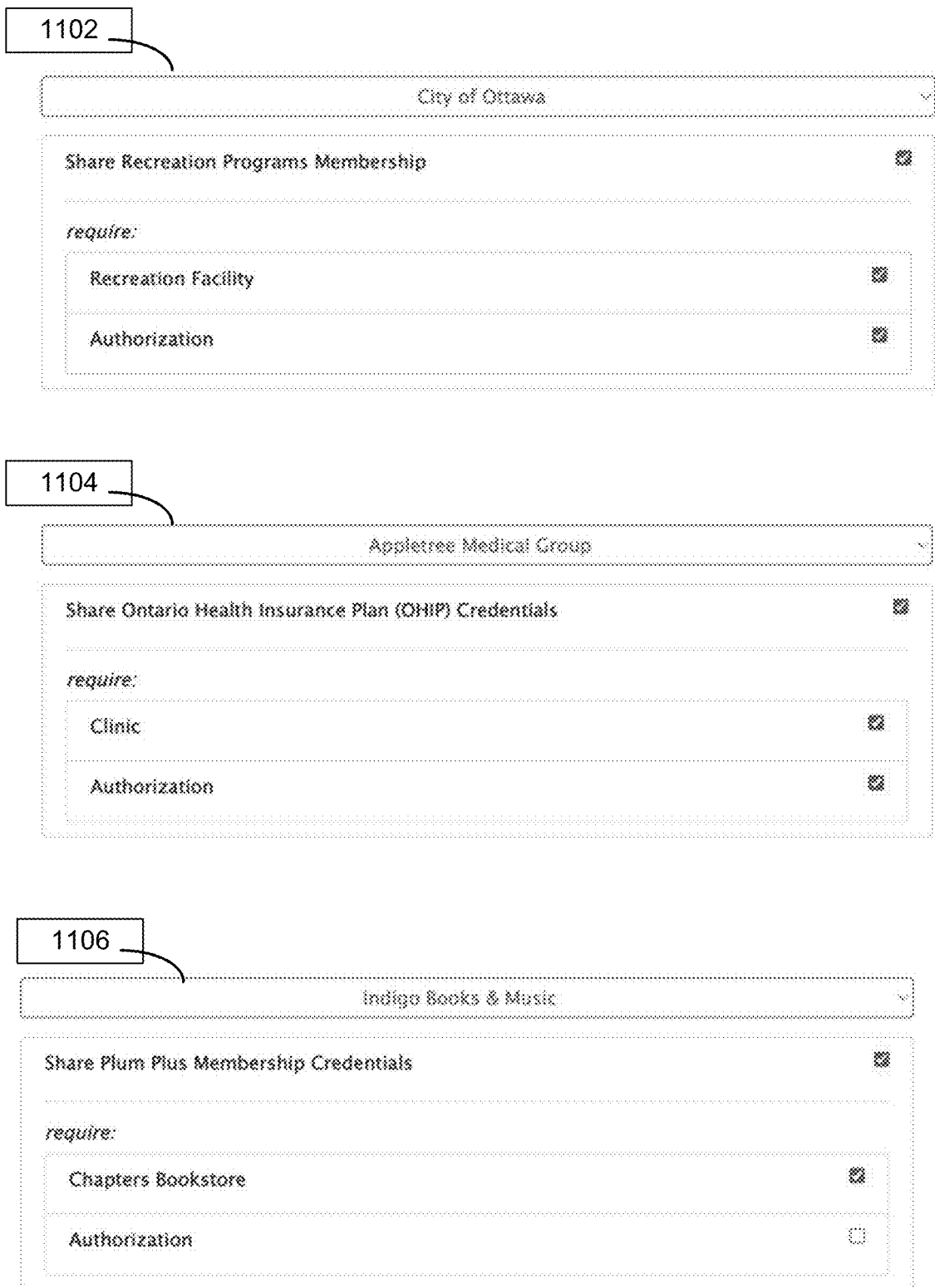
FIG. 11 illustrates a graphical user interface, in accordance with some embodiments of the present disclosure.

FIG. 11 illustrates some examples of grants setup for a few different organizations. The first example 1102 is to present the owner's membership credentials for the city of Ottawa's recreational programs (swimming, basketball court, gym, etc.) when the owner scans a passport activation device at one of city of Ottawa's recreational facilities, after verifying the scan point's authorization to access membership credentials.

The second example 1104 is to furnish his Ontario Health Insurance Plan (OHIP) credentials when he scans his passport activation device at an Appletree Medical Group clinic, after verifying the scan point's authorization to access his medical insurance credentials.

The third example 1106 is to provide his Plum Plus membership credentials (a loyalty program) when the owner scans the passport activation device at a Chapters or Indigo bookstore.

This framework of identity, grants, requisites, and authorizations is a powerful tool that can be employed to extend the utility of the passport to facilitate numerous interactions. Certain types of interactions, such as making a payment, might necessitate additional verifications for higher security and this can be affected in several ways, including a prompt on one's smart device or on a point of sale (POS) machine to enter a pass code, palm scan, or the like.

In various embodiments, the owner of the passport virtual device can easily disassociate an activation device 16 (passport activation device) from it, and associate another. For example, the owner may have compatible proximity devices embedded in several objects, and the owner might want to have one or another associated for the day or for an event, or the like. The owner may easily do so by scanning the device the owner desires to associate, which will bring up the setup interface allowing him to change the association.

Furthermore, at some point, the owner may want to sell or gift a carrier of the activation device 16, such as the bracelet, and therefore also transfer ownership of the embedded passport activation device. The owner may also accomplish this from the additional modes available in an activation device setup. In "open" mode, any registered user may scan the device, and set it up as their own. In the "security code" mode, any registered user may scan the device, provide the correct security code setup by the previous owner, and then set it up as their own. In the "request transfer" mode, any registered user may scan the device and request transfer of ownership, which if the user does, will notify the current owner who may allow or decline.

Finally, there's the possibility of the owner losing, for example, the bracelet containing an embedded activation device, an activation point associated with a passport virtual device. In such a situation, the owner can mark the embedded activation device as lost. Marking an activation device "lost" temporarily disassociates it from the passport virtual device or application and associates it with a loop virtual device or application specifically designed to handle lost objects. Disassociating the activation device/proximity device deactivates the passport virtual device. However, it will be reactivated as soon as the owner associates another compatible activation device with it. At the same time, the activation device in the lost bracelet is now associated with the newly created or existing lost-objects loop. When someone scans a lost activation device or the embedded activation device in a lost object associated with a lost-objects loop, that user may immediately see that the object has been marked lost by its owner. In addition, the user may see a custom message from the owner, and have one or more methods of contacting the owner, as configured by the owner. For example, the scanner may initiate a chat, or request a call with the owner, or the scanner may post electronic mail for the owner.

As such, the systems and methods of the present disclosure provide the activation device 16 which is a secure NFC tag. As mentioned above, another type of activation point may include an on-screen QR-code. This QR-code encodes similar data as is contained in the secure NFC tag but in the form of a secure token, such as a JSON Web Token.

Personas, Acquaintances, and Presumed-Friends

A persona may be thought of as a character that one presents to others or that others perceive of one, or a character one adopts for certain purposes. It may represent a character that is wholly real or authentic, part real and part fiction, or entirely made-up. An acquaintance may be thought of as a connection or contact who is not as close as a friend, and whom one might know less than a friend. A presumed friend may be thought of as someone that one considers (or presumes) to be a friend, but unbeknownst to one this presumed friend considers their relationship less than a friendship.

As discussed below, use of these concepts is described in a new and specific manner that adds value to interactions that may be entirely online, or partially online and partially in-person.

In the context of an online platform for interactions between individuals and groups, it is common practice to have certain people on one's contacts-list. These contacts are sometimes labeled as connections or friends, and may include one's real friends, family, muses, celebrities, and just about anyone one wishes to have as a contact to be able to communicate with them, follow their activities, or the like.

An owner of a virtual device may associate the owner's real identity as defined in the owner's account profile with the application associated with this virtual device. The application may be associated with the owner's friends in the context of the service. The owner may create various personas that the author has created for the purposes of interacting with others to achieve specific objectives. For example, a fictional cartoon character may be created for light-hearted social interactions, while one uses the author's real name and professional identity for professional interactions.

Each of the author's contacts may be associated with one or another of his personas. For example, some contacts may be associated with a social persona. While other contacts may be connected to the author through a professional persona.

The term persona often carries negative connotations, sometimes referring to an assumed identity created to deceive others, or to an assumed identity in people with multiple personality disorder, etc. However, personas are also used often by professional writers, actors, singers, and other public personalities for marketing purposes, and for keeping their professional and personal lives compartmentalized. In the context of the service, personas are used in several ways. First, personas may be used for maintaining separate groups of contacts. For example, to keep one's professional connections separate from one's personal connections, or to keep one group of friends separate from another, or to keep one's family connections separate from one's friends, or the like. Second, personas may be used for maintaining privacy. In an earlier section we introduced the loop virtual device, that may be accessed through contact points, and which allows anyone to establish contact and to communicate with the owner without needing or having their contact information. Such a device allows communications in the form of chat, voice, and video calling, and electronic mail. In this context the owner can choose to communicate with other parties through a persona. For example, in the context of a door loop, the owner may create a persona named "homeowner" to communicate with visitors at the door. The owner may be using a persona "Popeye"

to chat with a street vendor who called upon the owner through his door loop. Another use case of a persona is like that of using a penname in the real-world, where a person may use a persona to write blogposts, for example.

Answering the door loop using a persona or writing a blogpost using a presumed identity does not require the persona to be connected to another person. In the context of the service, users may connect with other users through one of their personas or presumed identities. Such a connection may be referred to as one's acquaintances. Such connections, i.e., acquaintances, may be restricted to connecting through one's persona or presumed identity. For example, in the context of the service, users may not be allowed to connect with others through personas unless they have had some contact in person. This means that the two have either met or they have been to the same event and know someone in common, but do not necessarily know each other well enough to know their real identity.

One way for a user to make an acquaintance is for that user to ask someone whom that user has met in a social gathering to scan the user's passport activation device. The user's "connect as" setting may be configured to a persona. For example, Jennifer may have created a persona named Anna Sinclair, to connect with people she might meet in social situations. She might use her real photo, just one that looks a little different from the one on her real profile, to keep it real enough. This allows her to keep the connections she makes as Anna Sinclair separated from the ones she makes as her real identity, Jennifer, and from those she makes as other personas she may have created. Additionally, this allows her to exert control over her security, privacy, and choices. If she disconnects from one of the contacts she's made as Anna Sinclair, that person will not be able to contact her again because the service may be configured such that personas are not searchable. The person may not be able to find her on the service without knowing her real identity; additionally, the application may allow Jennifer to make her real identity also not searchable.

Another way to interact through personas is through an event that two people may both attend such as, for example, a wedding of a mutual friend. This mutual friend has setup gateway activation devices to create an online group within the service for social exchanges related to the physical event. "Gateway" may be another virtual device associated with an application one of whose functions is to create an online group of people who are related through a physical event. The people in the group so-created do not need to be on each other's contacts-list. They are considered related through the group representing the event where they were both present. People at the event may join this online group by scanning the gateway activation devices at the event. They may join the group using their real identity or using a persona. If they join using a persona, then others on the group will start to recognize them as this persona. Through the relationship of having attended the same event, these people may interact with each other via chat, for example, which may identify them with the identity they used to join the group. This strategy limits abuse by requiring that each participant scan a gateway activation device at the event, which ensures that they were physically present at the event, which in turn means that their real identity is likely known to at least someone at the event. Moreover, the host or an administrator of the group can remove anyone from the group, should they sense abuse.

Mutability

While the virtual device function may change based on who scans it—whether it is an individual, business, or another type of entity, the attributes and authorizations associated with the point of scan device or application, and the grants, authorizations, and requisites setup by the owner or administrator in the backend service—earlier, an example was presented of this with the passport virtual device where its function changed between when it was scanned by an individual (make connection, download vCard) and when it was scanned by a healthcare clinic (provide health insurance credentials, medical history, and list of currently used medications), the term mutability may refer to changes that are more distinct, such as in an earlier cited example where a bracelet embedded with a passport activation device is lost, and once the owner marks it lost in the backend service setup associated with the embedded device—by changing its "mode" from "associated" to "lost", the passport activation device becomes disassociated from the passport virtual device and gets associated with a lost-objects loop virtual device: The associated virtual device mutates from being a passport virtual device to become a loop virtual device. Below we present another example of mutability.

In various embodiments, the virtual device to which an activation device 16 is associated with at one time may mutate at certain points in the lifecycle of the carrier object. For example, the activation device, such as a secure multi-feature tag embedded in an article of clothing may at first be associated with a virtual device that allows the manufacturer to track the object during production, quality control, packaging, or the like, and until the article is handed off to the distributor or warehouse, at which point the associated virtual device may mutate to serve the warehouse tracking and inventory processes. Later, when the article is transferred to the retailer, the associated virtual device may mutate once again to serve the retailer's need of tracking, inventory, and electronic article surveillance (EAS), or anti-theft functionality. Finally, when the article is sold to an end-customer, the associated device may mutate again to become an owner's loop device. Typical functions associated with tags on articles of clothing include tracking, inventory, electronic article surveillance, and certification of authenticity. Dual-frequency tags allow, additionally, end consumers to interact with the tag by scanning it with a smartphone NFC reader.

Normally, when an activation device 16 for the end consumer is setup, it may be configured to hide all identifying information, including its UID. For example, the NXP NTAG424DNA chip allows us to setup Random ID, which presents a random ID to anyone who scans it instead of its true UID. To retrieve the chip's unique ID (UID), one would have to know the cryptography key used to hide it; this key is safely stored in the backend service, and only available for use by authorized parties. At certain stages of the activation device's lifecycle, it may be important that the UID is not hidden. For example, the manufacturer, warehouse, and retailer may want to be able to track and inventory objects even when their systems are not connected to our backend service, or for simplicity and speed; or hiding the UID may not be of any value to them. Therefore, in such cases, the activation device 16 may be set up to, initially, not hide its UID, and until it is sold to the end-customer. The changeover to hiding the UID may be done at the point of sale by the retailer or after the purchase by the customer using a smartphone, for example, when associating the new purchase (embedded with the activation device) with an owner's loop virtual device.

If the owner sells the article in a secondhand deal, the ownership of the embedded activation device can be transferred, as has been discussed earlier, to the new owner. If the article ends up in a secondhand store, or in charity stock, however, the associated virtual device function may be mutated again to serve the tracking, inventory, and EAS function needed by the secondhand store or by the charity stock warehouse.

The mutability of the associated functionality (virtual device) and change in ownership creates significant new possibilities. For example, in the case of a women's designer handbag, which is embedded with a dual-frequency activation device during manufacture, the manufacturer may associate additional information about the object in the object's metadata and provenance, (e.g., the manufacturer may associate it with the brand and the designer of the object). As the ownership of this handbag transfers from manufacturer to distributor to retailer to consumer to secondhand store to consumer to recycling, the functionality of the associated (virtual) mutable device changes between one or more of tracking, inventorying, EAS, cashier-less shopping, owner's loop, recording end-of-life and environmental impact. As such, the applications associated with the virtual device or the virtual devices if changed during the lifecycle of the handbag are changed. Additionally, since the activation device is embedded with a universally unique ID, it is uniquely identifiable, and since the activation device is embedded at time of manufacture, the object's history is recorded throughout its lifecycle. This provenance affords such functionality as interactions between the parties in the object's lifecycle; for example, between designer and end-user(s), between brand and end-user(s), among end-users of instances of that object or users of that designer's objects, or the like. The interactions may include contacting and communicating, sharing experiences, shopping, customer support, or the like.

The examples discussed in the present disclosure may be realized using the NXP NTAG424DNA chip that employs AES-128 cryptography. These examples utilized only one of many possible setups possible with this chip that enable it to serve in an activation device 16 usable with the services created and that may be created in the future. This setup, as discussed earlier also, makes the chip provide a Secure Unique NDEF (SUN) message upon each tap readout which includes the chip UID, a counter value that is incremented upon each tap, a unique alphanumeric identifier known only to the backend service, all of which are obfuscated by cryptography, and a message authentication code to verify the integrity of the SUN message. The initial embodiments used this setup so that the activation devices embedded with this type of NFC device may be readable by most smartphones on the market, and, as much as possible, to make available the services associated with these activation devices without the need to download an app. This also meant that it is not required for the end-customer to write to the NFC chip embedded in the activation device, except only occasionally. However, the present disclosure is not limited to the use of AES-128 cryptography, or to the specific setup that delivers a SUN Message upon every tap, or to not needing to write to the NFC chip, or to any specific proximity device. Fundamentally, in some instances there may be a need to hide the proximity device's unique ID(s) for privacy and security, and to prevent abuse. Also, it may be needed to use the hidden counter that is incremented upon each tap readout to prevent another type of misuse where the tap data is used more than once, or it is used out of order. Also there may be a need to use a hidden alphanumeric value that may be programmed before delivering the activation device to the customer to verify the activation point's authenticity and to detect counterfeit devices that may be embedded in the ecosystem by malicious entities.

Therefore, in other embodiments, other types of cryptography and other types of setups may be used to identify the activation device 16, to detect re-use or out of order use of data read from the activation device 16, to verify the activation device's authenticity, to rule out counterfeit and tampered-with activation devices, to enable additional functionality through the activation device, such as, but not limited to, writing to the device to store additional data that may be utilized in off-line circumstances, including, but not limited to asymmetric key cryptography, elliptic curve cryptography, and other mechanisms that may be based on a combination of methods such as challenge-response protocols to authenticate and or to establish secure channels of communication. These additional embodiments may also include setups where some cryptography keys are embedded in secure elements in the reader device to enable off-line usage of some or all the functionality associated with the activation device.

Figure 12:
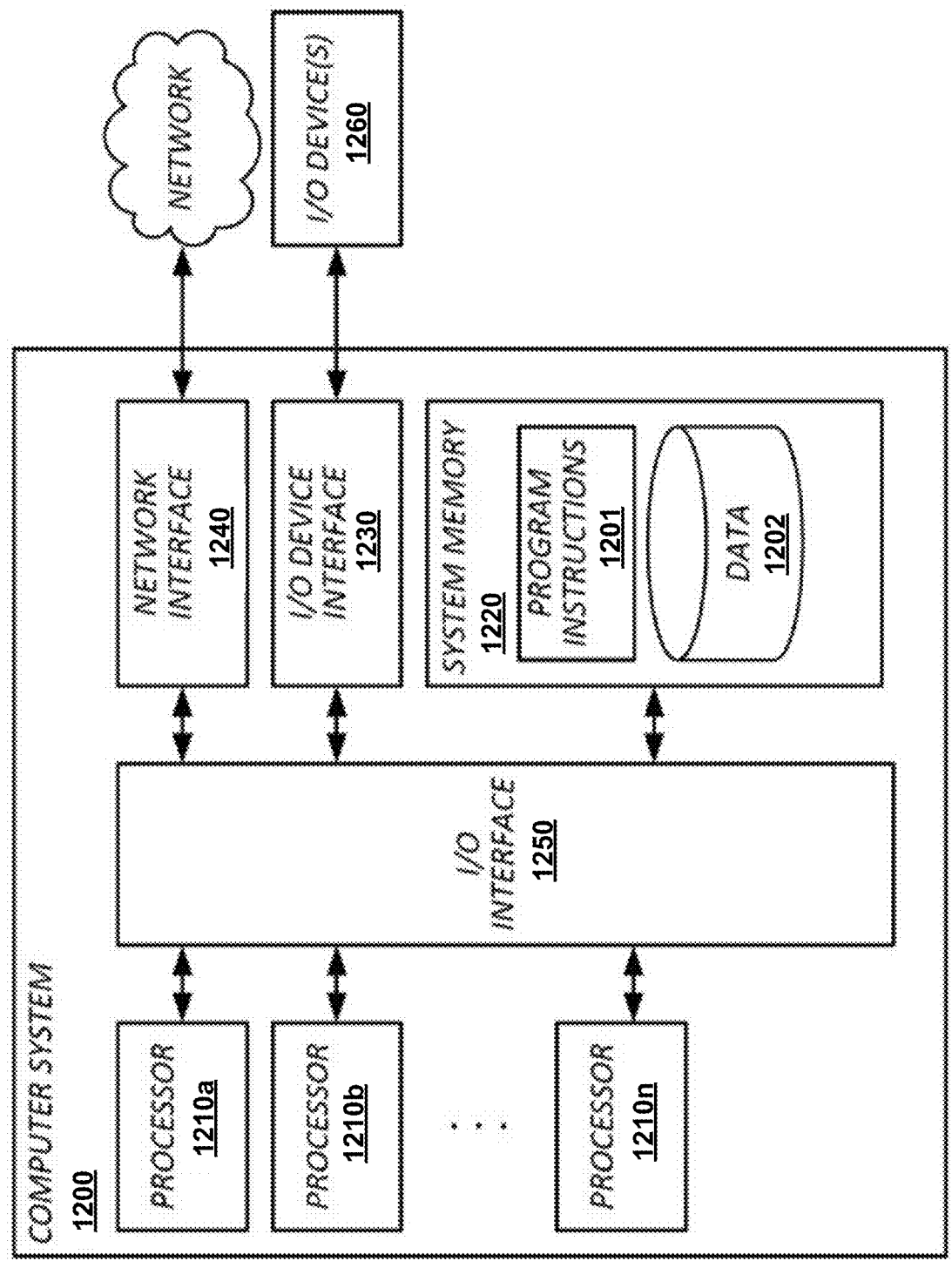
FIG. 12 illustrates an example computing device by which the present techniques may be implemented in some embodiments.

FIG. 12 is a diagram that illustrates an exemplary computing system 1200 in accordance with embodiments of the present technique. Various portions of systems and methods described herein, may include or be executed on one or more computer systems similar to computing system 1200. Further, processes and modules described herein may be executed by one or more processing systems similar to that of computing system 1200. For example, the client computing device 14/300, the server computing device 12/200, or the activation device 16 may be provided by computing system 1200.

Computing system 1200 may include one or more processors (e.g., processors 1210a-1210n) coupled to system memory 1220, an input/output I/O device interface 1230, and a network interface 1240 via an input/output (I/O) interface 1250. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1200. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1220). Computing system 1200 may be a uni-processor system including one processor (e.g., processor 1210a), or a multi-processor system including any number of suitable processors (e.g., 1210a-1210n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1200 may include a plurality of computing devices (e.g., distributed computer systems) to implement various processing functions.

I/O device interface 1230 may provide an interface for connection of one or more I/O devices 1260 to computer system 1200. I/O devices may include devices that receive input (e.g., from a user) or output information (e.g., to a user). I/O devices 1260 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1260 may be connected to computer system 1200 through a wired or wireless connection. I/O devices 1260 may be connected to computer system 1200 from a remote location. I/O devices 1260 located on remote computer system, for example, may be connected to computer system 1200 via a network and network interface 1240.

Network interface 1240 may include a network adapter that provides for connection of computer system 1200 to a network. Network interface 1240 may facilitate data exchange between computer system 1200 and other devices connected to the network. Network interface 1240 may support wired or wireless communication. The network may include an electronic communication network, such as the Internet, a local area network (LAN), a wide area network (WAN), a cellular communications network, or the like.

System memory 1220 may be configured to store program instructions 1201 or data 1202. Program instructions 1201 may be executable by a processor (e.g., one or more of processors 1210a-1210n) to implement one or more embodiments of the present techniques. Instructions 1201 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1220 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1220 may include a non-transitory computer readable storage medium that may have program instructions stored thereon that are executable by a computer processor (e.g., one or more of processors 1210a-1210n) to cause the subject matter and the functional operations described herein. A memory (e.g., system memory 1220) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1250 may be configured to coordinate I/O traffic between processors 1210a-1210n, system memory 1220, network interface 1240, I/O devices 1260, and/or other peripheral devices. I/O interface 1250 may perform protocol, timing, or other data transformations to convert data signals from one component (e.g., system memory 1220) into a format suitable for use by another component (e.g., processors 1210a-1210n). I/O interface 1250 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1200 or multiple computer systems 1200 configured to host different portions or instances of embodiments. Multiple computer systems 1200 may provide for parallel or sequential processing/execution of one or more portions of the techniques described herein.

Those skilled in the art will appreciate that computer system 1200 is merely illustrative and is not intended to limit the scope of the techniques described herein. Computer system 1200 may include any combination of devices or software that may perform or otherwise provide for the performance of the techniques described herein. For example, computer system 1200 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1200 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A non-transitory, machine-readable medium storing instructions that, when executed by one or more processors, effectuate operations comprising: receiving, with a computer system, a first message that is generated in response to a first client computing device associating with a first activation device, wherein the first message includes a first client computing device identifier associated with a first user of the first client computing device and a first activation device identifier for the first activation device; identifying, with the computer system and based on an association configuration and the first activation device identifier, a first virtual device that is associated with the first activation device; identifying, with the computer system and based on the first virtual device and the association configuration, a first application associated with the first virtual device; and running, with the computer system, the first application associated with the first virtual device in response to the first message.

2. The medium of embodiment 1, wherein the operations further comprise: receiving, with the computer system, an instruction to associate the first virtual device with a second application; disassociating, with the computer system, the first application from the first virtual device by updating the association configuration; associating, with the computer system, the second application with the first virtual device; and running, with the computer system and in response to a second message being received for the first virtual device, the second application.

3. The medium of any one of embodiments 1-2, wherein the operations further comprise: providing, with the computer system and in response to running the first application, a first graphical user interface to a second client computing device.

4. The medium of embodiment 3, wherein the second client computing device is associated with an owner of the first virtual device according to the association configuration.

5. The medium of any one of embodiments 1-4, wherein the operations further comprise: receiving, with the computer system, an instruction to disassociate the first activation device from the first virtual device; and disassociating, with the computer system, the first activation device from the first virtual device by updating the association configuration, wherein if a client computing device associates with the first activation device, the first virtual device is not identified in any messages received.

6. The medium of embodiment 5, wherein the operations further comprise: receiving, with the computer system, a second instruction to associate the first activation device with a second virtual device; associating, with the computer system, the first activation device with the second virtual device by updating the association configuration; and running, with the computer system and in response to any subsequent message being received for the second virtual device that includes the first activation device identifier, a second application that is associated with the second virtual device according to the association configuration.

7. The medium of embodiment 6, wherein the second application is different from the first application.

8. The medium of embodiment 6, wherein the first virtual device is associated with a first owner and a second client computing device associated with the first owner and the second virtual device is associated with a second owner and a third client computing device that is associated with the second owner.

9. The medium of any one of embodiments 1-8, wherein the operations further comprise: receiving, with the computer system, a second message that is generated in response to a second client computing device associating with the first activation device, wherein the second message includes a second client computing device identifier associated with a second user of the second client computing device and the first activation device identifier for the first activation device; identifying, with the computer system and based on an association configuration and the first activation device identifier, the first virtual device that is associated with the first activation device; identifying, with the computer system and based on the first virtual device, the second client computing device identifier, and the association configuration, a second application associated with the first virtual device; and running, with the computer system, the second application associated with the first virtual device in response to the second message.

10. The medium of any one of embodiments 1-9, wherein the operations further comprise: receiving, with the computer system, a second message that is generated in response to a second client computing device associating with the first activation device, wherein the second message includes a second client computing device identifier associated with a second user of the second client computing device and the first activation device identifier for the first activation device; identifying, with the computer system and based on an association configuration, the first activation device identifier, and the second client computing device identifier, a second virtual device that is associated with the first activation device; identifying, with the computer system and based on the second virtual device and the association configuration, a second application associated with the second virtual device; and running, with the computer system, the second application associated with the first virtual device in response to the second message.

11. The medium of any one of embodiments 1-10, wherein the first activation device is embedded in an object.

12. The medium of any one of embodiments 1-11, wherein the first activation device is removable from an object to which it is coupled with.

13. The medium of any one of embodiments 1-12, wherein the first activation device is a virtual activation device presented as a virtual object in an augmented reality or virtual reality environment.

14. The medium of any one of embodiments 1-13, wherein the first activation device is a physical activation devices that includes at least one of a radio frequency identification (RFID) tag, a near field communication (NFC) tag, a Bluetooth low energy (BLE) beacon, a dual-frequency tag, or a ultra-wide band (UWB) device.

15. The medium of any one of embodiments 1-14, wherein the first message includes a secure unique NFC data exchange format (NDEF) (SUN) message.

16. The medium of any one of embodiments 1-15, wherein the first message includes location information of the first client computing device, and wherein the running of the first application is further in response to the location information satisfying a location condition.

17. The medium of any one of embodiments 1-16, wherein the first activation device and the first virtual device is associated with a second user as an owner of the first activation device and the first virtual device in the association configuration.

18. The medium of embodiment 17, wherein the operations further comprise: receiving, with the computer system, a request to change ownership of the first activation device; disassociating, with the computer system, the first activation device from the first virtual device in the association configuration; and associating, with the computer system, the first activation device with a second virtual device that is associated with the second user.

19. The medium of any one of embodiments 1-18, wherein the operations further comprise steps for validating the first activation device.

20. A method comprising: the operations of any one of embodiments 1-19.

21. A system, comprising: one or more processors; and memory storing instructions that when executed by the processors cause the processors to effectuate operations comprising: the operations of any one of embodiments 1-19.

What is claimed is:

1. A non-transitory, machine-readable medium storing instructions that, when executed by one or more processors, effectuate operations comprising:
  receiving, with a computer system, a first message that is generated in response to a first client computing device associating with a first activation device, wherein the first message includes a first client computing device identifier associated with a first user of the first client computing device and a first activation device identifier for the first activation device;
  identifying, with the computer system and based on an association configuration and the first activation device identifier, a first virtual device that is associated with the first activation device;
  identifying, with the computer system and based on the first virtual device and the association configuration, a first application associated with the first virtual device; and
  running, with the computer system, the first application associated with the first virtual device in response to the first message.

2. The medium of claim 1, wherein the operations further comprise:
  receiving, with the computer system, an instruction to associate the first virtual device with a second application;
  disassociating, with the computer system, the first application from the first virtual device by updating the association configuration;
  associating, with the computer system, the second application with the first virtual device; and
  running, with the computer system and in response to a second message being received for the first virtual device, the second application.

3. The medium of claim 1, wherein the operations further comprise:
  providing, with the computer system and in response to running the first application, a first graphical user interface to a second client computing device.

4. The medium of claim 3, wherein the second client computing device is associated with an owner of the first virtual device according to the association configuration.

5. The medium of claim 1, wherein the operations further comprise:
  receiving, with the computer system, an instruction to disassociate the first activation device from the first virtual device; and
  disassociating, with the computer system, the first activation device from the first virtual device by updating the association configuration, wherein if a client computing device associates with the first activation device, the first virtual device is not identified in any messages received.

6. The medium of claim 5 wherein the operations further comprise:
  receiving, with the computer system, a second instruction to associate the first activation device with a second virtual device;

associating, with the computer system, the first activation device with the second virtual device by updating the association configuration; and running, with the computer system and in response to any subsequent message being received for the second virtual device that includes the first activation device identifier, a second application that is associated with the second virtual device according to the association configuration.

7. The medium of claim 6, wherein the second application is different from the first application.

8. The medium of claim 6, wherein the first virtual device is associated with a first owner and a second client computing device associated with the first owner and the second virtual device is associated with a second owner and a third client computing device that is associated with the second owner.

9. The medium of claim 1, wherein the operations further comprise:

receiving, with the computer system, a second message that is generated in response to a second client computing device associating with the first activation device, wherein the second message includes a second client computing device identifier associated with a second user of the second client computing device and the first activation device identifier for the first activation device;

identifying, with the computer system and based on an association configuration and the first activation device identifier, the first virtual device that is associated with the first activation device;

identifying, with the computer system and based on the first virtual device, the second client computing device identifier, and the association configuration, a second application associated with the first virtual device; and running, with the computer system, the second application associated with the first virtual device in response to the second message.

10. The medium of claim 1, wherein the operations further comprise:

receiving, with the computer system, a second message that is generated in response to a second client computing device associating with the first activation device, wherein the second message includes a second client computing device identifier associated with a second user of the second client computing device and the first activation device identifier for the first activation device;

identifying, with the computer system and based on an association configuration, the first activation device identifier, and the second client computing device identifier, a second virtual device that is associated with the first activation device;

identifying, with the computer system and based on the second virtual device and the association configuration, a second application associated with the second virtual device; and running, with the computer system, the second application associated with the first virtual device in response to the second message.

11. The medium of claim 1, wherein the first activation device is embedded in an object.

12. The medium of claim 1, wherein the first activation device is removable from an object to which it is coupled with.

13. The medium of claim 1, wherein the first activation device is a virtual activation device presented as a virtual object in an augmented reality or virtual reality environment.

14. The medium of claim 1, wherein the first activation device is a physical activation devices that includes at least one of a radio frequency identification (RFID) tag, a near field communication (NFC) tag, a Bluetooth low energy (BLE) beacon, a dual-frequency tag, or a ultra-wide band (UWB) device.

15. The medium of claim 1, wherein the first message includes a secure unique NFC data exchange format (NDEF) (SUN) message.

16. The medium of claim 1, wherein the first message includes location information of the first client computing device, and wherein the running of the first application is further in response to the location information satisfying a location condition.

17. The medium of claim 1, wherein the first activation device and the first virtual device is associated with a second user as an owner of the first activation device and the first virtual device in the association configuration.

18. The medium of claim 17, wherein the operations further comprise:

receiving, with the computer system, a request to change ownership of the first activation device;

disassociating, with the computer system, the first activation device from the first virtual device in the association configuration; and associating, with the computer system, the first activation device with a second virtual device that is associated with the second user.

19. The medium of claim 1, wherein the operations further comprise steps for validating the first activation device.

20. A method, comprising:

receiving, with a computer system, a first message that is generated in response to a first client computing device associating with a first activation device, wherein the first message includes a first client computing device identifier associated with a first user of the first client computing device and a first activation device identifier for the first activation device;

identifying, with the computer system and based on an association configuration and the first activation device identifier, a first virtual device that is associated with the first activation device;

identifying, with the computer system and based on the first virtual device and the association configuration, a first application associated with the first virtual device; and running, with the computer system, the first application associated with the first virtual device in response to the first message.

* * * * *